United States Patent [19]

Clark

[11] Patent Number: 5,089,885

[45] Date of Patent: Feb. 18, 1992

[54] TELEPHONE ACCESS DISPLAY SYSTEM WITH REMOTE MONITORING

[75] Inventor: Morris Clark, Coconut Grove, Fla.

[73] Assignee: Video Jukebox Network, Inc., Miami, Fla.

[21] Appl. No.: 226,807

[22] Filed: Aug. 1, 1988

Related U.S. Application Data

[63] Continuation-in-part of Ser. No. 930,207, Nov. 14, 1986, Pat. No. 4,761,684.

[51] Int. Cl.$^5$ .............................. H04N 7/14
[52] U.S. Cl. ...................... 358/86; 358/84; 379/102; 455/2
[58] Field of Search ............ 358/84, 86; 455/2, 4; 379/102, 105

[56] References Cited

U.S. PATENT DOCUMENTS

| | | | |
|---|---|---|---|
| 3,278,677 | 10/1966 | Fannoy . | |
| 3,790,700 | 2/1974 | Callais et al. . | |
| 3,997,718 | 12/1976 | Ricketts et al. . | |
| 4,028,733 | 6/1977 | Ulicki | 358/86 X |
| 4,071,697 | 1/1978 | Bushnell et al. . | |
| 4,163,255 | 7/1979 | Pires | 358/84 X |
| 4,264,923 | 4/1981 | Reich . | |
| 4,264,924 | 4/1981 | Freeman | 358/86 |
| 4,331,974 | 5/1982 | Cogswell et al. | 358/86 |
| 4,367,548 | 1/1983 | Cotten, Jr. et al. | 358/86 |
| 4,381,522 | 4/1983 | Lambert | 358/86 X |
| 4,404,589 | 9/1983 | Wright, Jr. | 358/86 |
| 4,450,477 | 5/1984 | Lovett | 358/86 |
| 4,451,701 | 5/1984 | Bendig . | |
| 4,499,568 | 2/1985 | Gremillet . | |
| 4,506,387 | 3/1985 | Walter | 358/86 X |
| 4,521,806 | 6/1985 | Abraham | 358/86 |
| 4,528,589 | 7/1985 | Block et al. | 358/84 X |
| 4,566,030 | 1/1986 | Nickerson et al. | 358/86 |
| 4,567,512 | 1/1986 | Abraham | 358/86 |
| 4,584,603 | 4/1986 | Harrison | 358/86 |
| 4,590,516 | 5/1986 | Abraham | 358/86 |
| 4,650,929 | 3/1987 | Boerger et al. | 358/86 |
| 4,710,955 | 12/1987 | Kauffmann | 358/84 X |
| 4,729,849 | 12/1988 | McCalley et al. | 358/86 |
| 4,733,223 | 3/1988 | Gilbert | 358/86 X |
| 4,734,764 | 3/1988 | Pocock et al. | 358/86 |
| 4,761,684 | 8/1988 | Clark et al. | 358/86 |
| 4,766,581 | 8/1988 | Korn et al. | 369/30 |
| 4,814,883 | 3/1989 | Perrine et al. | 358/86 X |
| 4,829,372 | 5/1989 | McCalley et al. | 358/86 |

FOREIGN PATENT DOCUMENTS

86/02224  4/1986  PCT Int'l Appl. ............. 358/86
2174874 11/1986  United Kingdom .

OTHER PUBLICATIONS

Falcone International, Inc., brochure distributed on or before 11/14/85.
Laser Television Systems, Inc., brochure, distributed on or before 11/14/85.
"Dial-A-View", Bulfer, talk given at the Motion Picture Industry Seminar, Dec. 3, 1984, Los Angeles, Calif.
SGEA/S64 Technical Manual, Texcscan MSI/Compuvid: "Video Teletext Option Interactive Public Access".
SG3A/S64 Technical Manual, Texcscan MSI/Compuvid, "Public Access (PA-1), Installation-Operation".
SG3A/S64 Technical Manual, Texcscan MSI/Compuvid: "High Performance Character Generator", Spectrum Gen III.

(List continued on next page.)

*Primary Examiner*—Jin F. Ng
*Assistant Examiner*—Wing F. Chan

[57] ABSTRACT

A method of using a programmed data processor to operate a video information selection system wherein a viewer can select video information to be displayed on a common channel of the television monitors of all viewers. The viewer accesses the data processor by use of a telephone keypad and selects video information to be broadcast by inputting a digital code. The data processor processes the signal generated, retrieves the video information from memory and places it on queue to be broadcast. A plurality of such slave video information selection systems can be remotely controlled, monitored and operated by a host programmed data processor at a location remote from the slave video information selection systems.

49 Claims, 23 Drawing Sheets

OTHER PUBLICATIONS

SG3A/S64 Technical Manual, Texcscan MSI/Compuvid: "High Performance Character Generator", Spectrum Gen IV.

"San Francisco State's Videotex 'Party Line'", H. A. Layer, EITV, Mar. 1983.

"Touch-Tone Teletext, a Combined Teletex-View Data System", Robinson and Loveless *IEEE Transactions on Consumer Electronics,* vol. CE-25, Jul. 1979.

"Stations That Show Only Ads Attract a Lot of TV Watchers", D. Kneale, The Wall Street Journal, 9/23/82, p. 37.

"The Success of Cableshop", R. McLean, The Boston Globe, 9/15/82, p. 61.

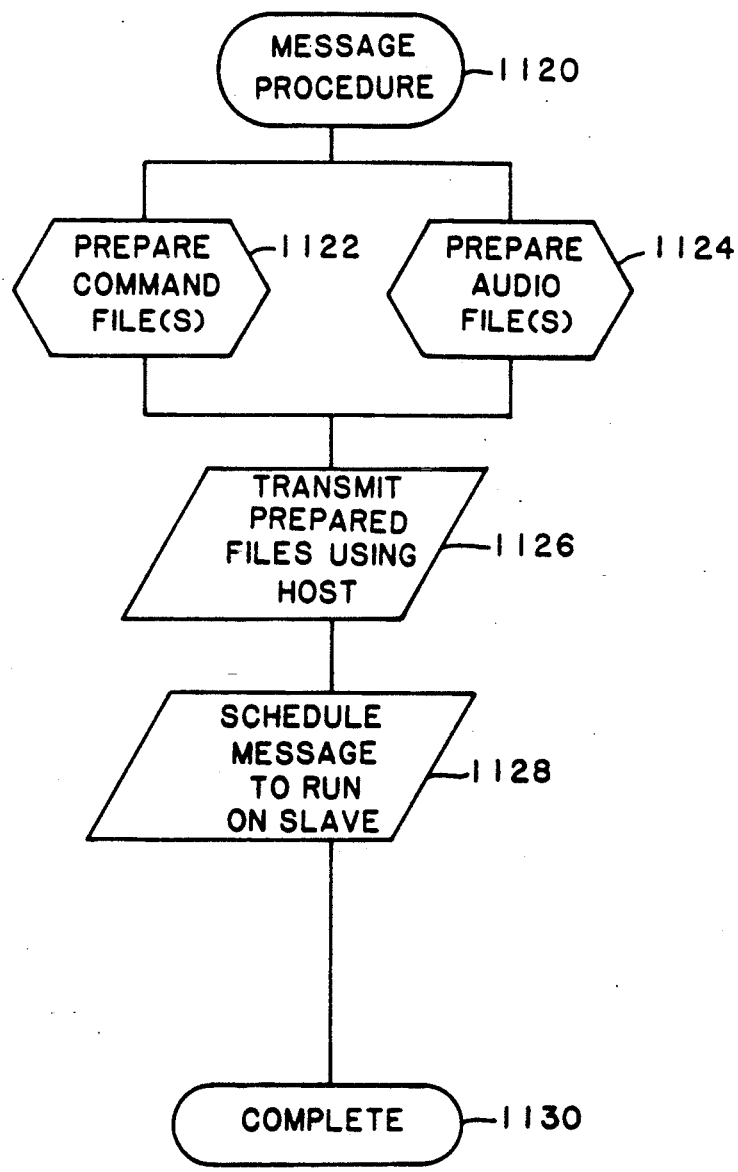

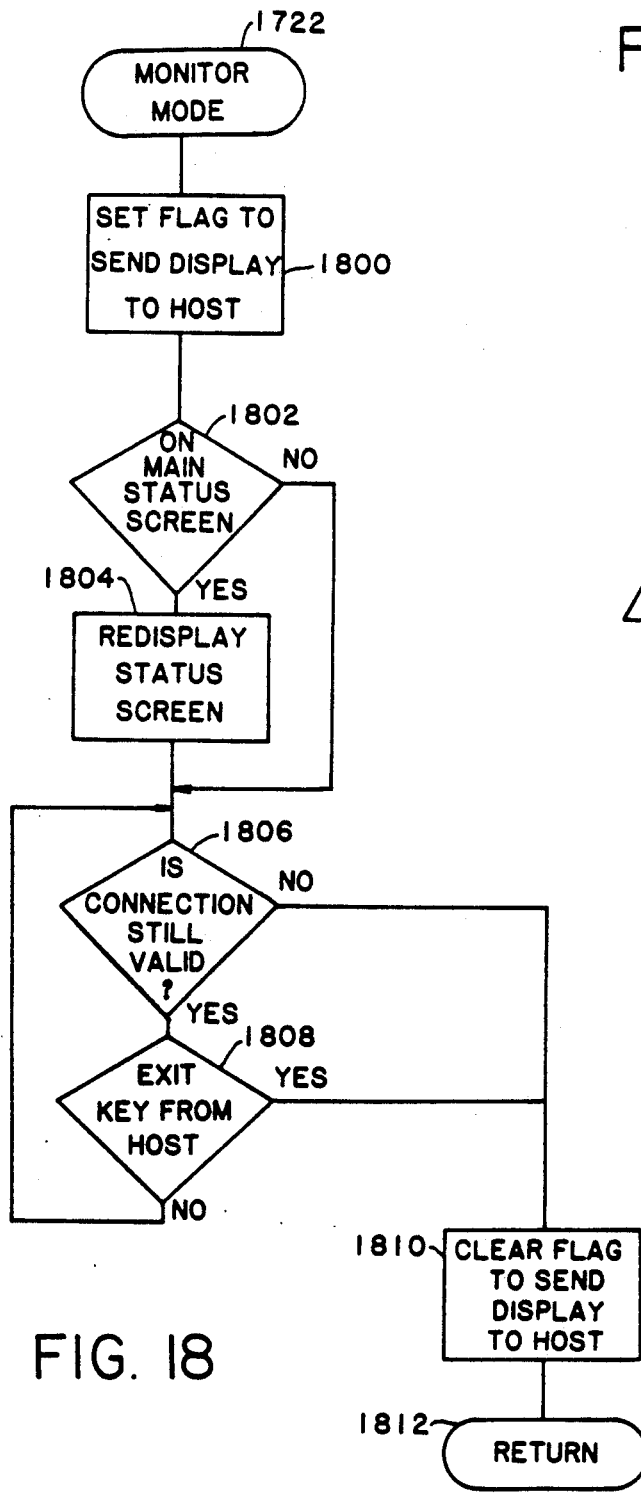
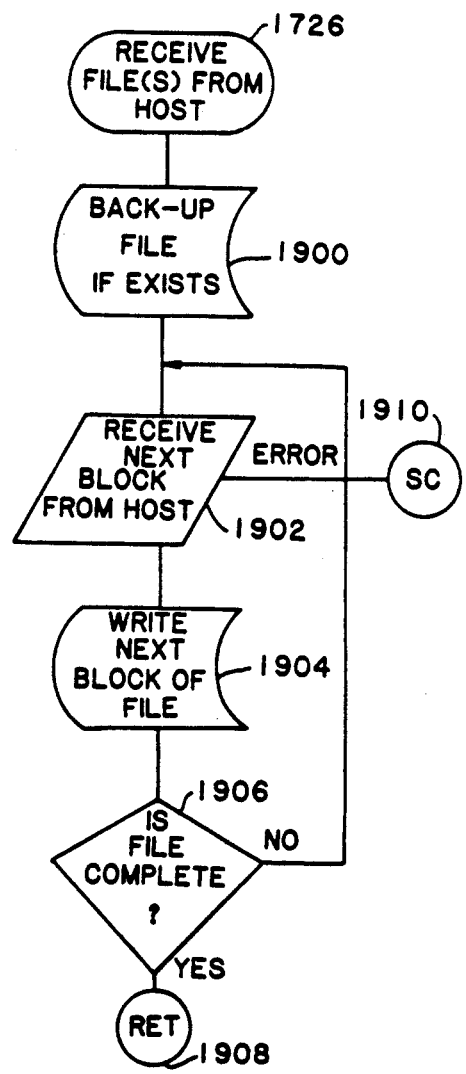
FIG. 18
FIG. 19

TELEPHONE ACCESS DISPLAY SYSTEM WITH REMOTE MONITORING

BACKGROUND OF THE INVENTION

This application is a continuation-in-part application of Ser. No. 930,207, entitled Telephone Access Display System filed Nov. 14, 1986, which issued as U.S. Pat. No. 4,761,684 on Aug. 2, 1988.

The present invention relates generally to a method of displaying subscriber selected video information on a television monitor. More particularly, the present invention relates to a method including a programmed data processor, of operating a system wherein remotely selected video information is broadcast by a cable television or television transmitter to all television receivers tuned to a predetermined channel. The selection occurs using a telephone keypad at the viewer's location. The data processor controls the retrieval of the information from its storage location and broadcasts the video selection to all the television receivers of cable subscribers or viewers.

There presently are systems that allow a subscriber to view selected video information on cable television. In a first such system, a transmitting station utilizes a coder unit to scramble the video and audio signal so that a conventional television cannot clearly receive the signals. A decoder is provided for each subscriber to unscramble to coded signal. The use of the decoder is recorded for billing purposes. Such a system allows the subscriber to view video information chosen by the cable company. However, the subscriber cannot view video information chosen by the subscriber.

In a second system, the subscriber is furnished with a list of video information that may be chosen. This video information is supplied through a free channel. The subscriber actuates a control at his home which searches for the free channel of a cable system. When that channel is found, the subscriber actuates a selector control which transmits a signal corresponding to the video information selected over the free channel to the cable head end. The head end then automatically selects the required film and starts the broadcast of the video information. This type of system is disclosed in U.S. Pat. No. 3,278,677 to Fannoy.

In a third system, such as shown in U.S. Pat. No. 4,264,924 to Freeman, a private coaxial cable distribution network allows a transmitting station to simultaneously transmit a plurality of unscrambled subscription television program signals to a plurality of subscribers on a plurality of television channels. The signals are related in time and content to each other. Each signal is transmitted at a different frequency which corresponds to a different television reception channel, with regular or free television programming being simultaneously provided at one or more further different television reception channel frequencies. Each subscriber is provided with a switch by which he can choose to view free television, listen to music or view pay television.

In a fourth system, a control unit is provided at the subscriber's home. The subscriber is provided with a list of video information that may be chosen. The subscriber actuates the control or command terminal unit to select the video information. This command terminal unit is a microprocessor with a keypad coupled to the telephone system and a cable. The cable system sends this video information in time compressed form to only the subscriber that requested it. The video information is converted to real time before it is broadcast at the subscriber's home. This type of system is disclosed in U.S. Pat. Nos. 4,590,516 and 4,567,512 to Abraham.

In a fifth system, a telephone at the subscriber's home is utilized instead of the control unit to select video information for viewing. The subscriber dials the cable television company and enters a digital code corresponding to the selected video information. The video information is sent via cable in time compressed form and is broadcast to the subscriber requesting it. This type of system is disclosed in U.S. Pat. No. 4,521,806 to Abraham.

In U.S. Pat. No. 4,381,522 to Lambert, a sixth system is disclosed. A subscriber enters a digital code on a telephone corresponding to the selected video information. In this system, there are a plurality of channels. There is a minicomputer at the cable station that responds to viewer selection signals provided on the telephone line. The channel and start and stop times for the selected program are displayed on the television monitor of all subscribers. The program is then broadcast so that any subscriber interested can view it. Each selected program is typically assigned for broadcast in the order that it is received.

These systems, however, do not allow a subscriber or viewer to select and view video information that will be broadcast to all subscribers or viewers on one common channel using only a conventional television receiver and a telephone having a Touch Tone keypad. The systems described above involve complex electronic equipment that increases the overall cost and down time of the system.

Nor do such systems allow for the remote diagnosis, operation, and control provided by the present invention. Such remote capabilities enable, for example, the receipt of a dedication forwarded from a central or host station to be displayed on a broadcast from a particular remote system location. In addition, the present system can utilize an audio track from one source and video information from another source and place them both on the outgoing line for display on each viewer's television receiver.

SUMMARY AND OBJECTS OF THE INVENTION

In view of the foregoing, it should be apparent that there still exists a need in the art for a method of operating a video information system so that a subscriber or viewer can select video information to be broadcast to all subscribers or viewers on one common channel using only a conventional Touch Tone keypad or telephone including such a keypad. In addition, there exists a need in the art for a method of and apparatus for operating a remote viewing system of selected video program material at local subscriber remote or slave locations which may be controlled and monitored from a remote centralized host location.

It is, therefore, an object of this invention to provide a method for subscribers of a cable television system to select video information to be broadcast on one common channel to all subscribers' television monitors using a telephone keypad.

It is another object of this invention to provide a method for placing video information on queue to be broadcast in accordance with the time the selection was made by the subscriber.

Another object of the present invention is to provide a method of and apparatus for the remote monitoring and controlling of slave remote systems for enabling the viewing of selected video program material at local subscriber remote receiving locations.

A further object of the present invention is to provide for the remote selection at remote receiving locations of video programs to be broadcast over the television receivers of all viewers of a predetermined channel utilizing two-way cable or low power RF input of selection signals by the viewers or cable subscribers.

Still another objection of the present invention is to provide apparatus for and a method of using an audio track from one source at a slave or host installation and video information from another source at that same slave or host location, to be output on a single channel from a video switch as controlled by the host or slave computer, respectively.

These and other objects are achieved by a method of operating a video information selection system using a programmed data processor in which a subscriber or viewer can select certain video information that is then displayed on one common channel of the television monitors of all subscribers or viewers. The subscriber's or viewer's telephone keypad is used to access a data processor. The invention may be designed to be used with the telephone company's "900" service. Using this service, a caller is charged a nominal fee per call by the telephone company. The video information system then recovers a portion of the fee from the phone company. The subscriber or viewer enters a digital code on the telephone keypad that corresponds to the video information desired for viewing. The selected video information is retrieved by the data processor from a memory device and broadcast over the cable system or by means of a television transmitter to the television receivers of all subscribers or viewers tuned to a predetermined single channel or frequency. The television transmitter may be a low power television transmitter or any other type of television transmitter.

The inventive method also includes the step of placing the selected video information in line or on queue so that the first video information selected is the first video information broadcast on the common channel and subsequent video information selected is broadcast in turn according to the relative time it was selected.

The inventive method further contemplates a plurality of slave or local cable television or low power RF transmitting systems which may be accessed by a viewer or subscriber at a location remote from the slave cable system or television transmitter for selecting video program material for display over a single channel for viewing by all viewers having television receivers tuned to that channel. While the viewer may preferably make the selection utilizing a telephone keypad, alternatively, a two-way cable box in the case of a cable based system or a low power RF transmitter in the case of either a cable or television transmitter system, may be utilized by the viewer for such purpose. A low power RF receiver, capable of receiving the signals transmitted by the low power RF transmitter used by the viewer, would thus be used to receive the signals transmitted by the subscriber or viewer for input into the computer of the slave or local system. The host or master system is typically located at a central location and controls, monitors and/or operates a plurality of such slave systems using the programmed data procesors of the respective systems. Communication between host and slave systems is accomplished by modems and telephone lines.

The inventive method and apparatus disclosed herein also includes the ability of a host, slave or local system to respond to multiple incoming telephone lines. Such multiple incoming telephone lines can be used, for example, by viewers to select several viewing options, such as one selection for a set price and three selections for a different set price.

With these and other objects, advantages and features of the invention that may become hereinafter apparent, the nature of the invention may be more clearly understood by reference to the following detailed description of the invention, the appended claims, and to the several drawings attached herein.

BRIEF DESCRIPTION OF THE DRAWINGS

FIG. 11 is a flow chart showing the functional steps of the message procedure program utilized with the present invention;

FIGS. 17(A), 17(B), 18-22 are flow charts showing the functional steps and subroutines of the slave program used with the present invention;

DETAILED DESCRIPTION FOR THE PREFERRED EMBODIMENT

Figure 1:
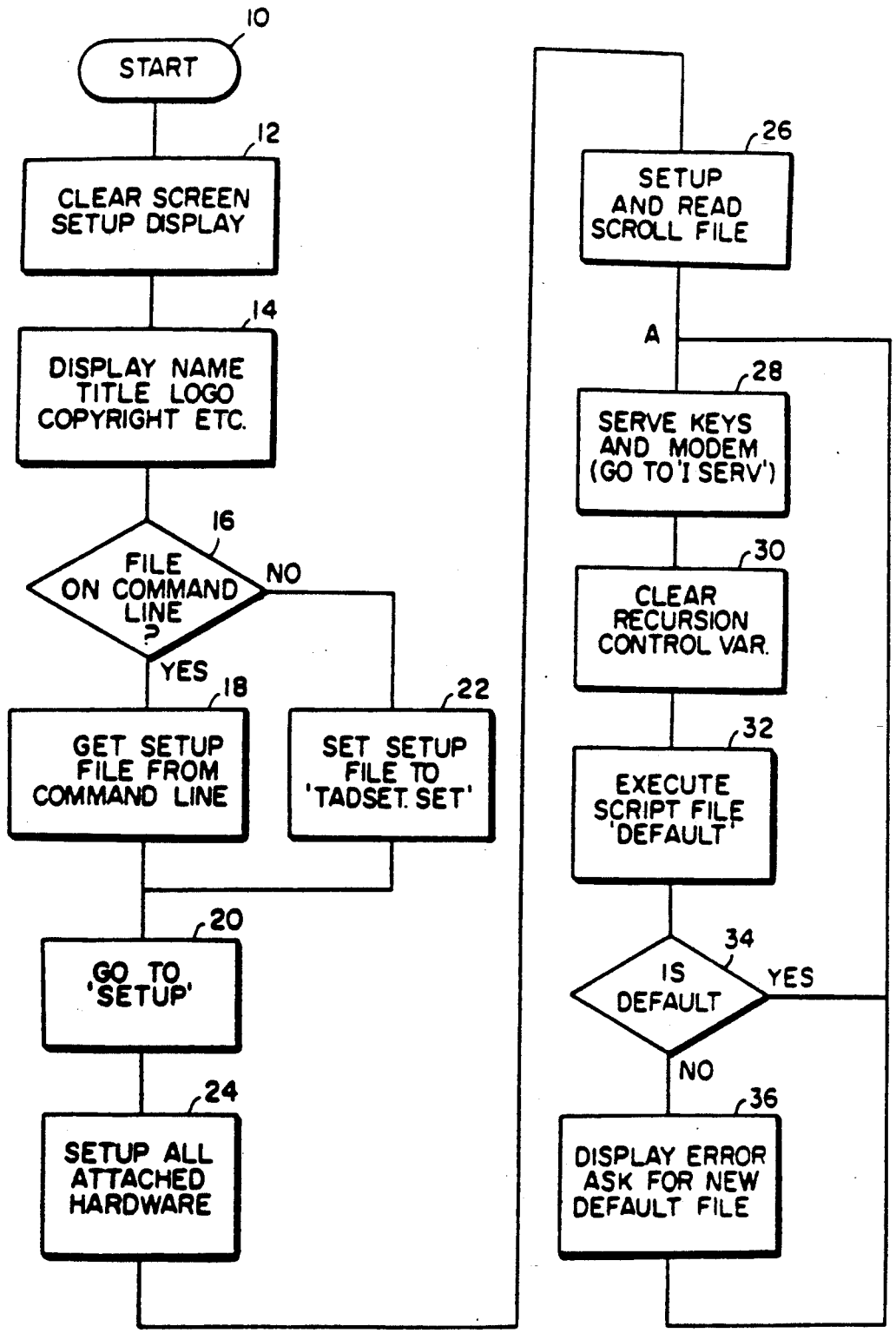
FIG. 1 is a flow chart showing the functional steps utilized by the method of the present invention.

Referring now to the drawings wherein like parts are designated by like reference numerals throughout, there is illustrated in FIG. 1 a flow chart showing the overall operation of the method of the present invention. That method is designed to be utilized by a cable television subscriber or a viewer of non-cable television, using the subscriber's or viewer's television, a telephone keypad, a modem and a programmed data processor. The television can be connected to receive the television signal using any available means, such as by cable, satellite or other broadcast transmission medium. The method of the present invention allows subscribers to request video information for display on one common channel of their televisions using a telephone operated control link. The inventive method may also be used on a plurality of independent channels.

The subscriber uses a telephone keypad to access the CATV system's central computer or a separate computer located at the head end of a CATV system or transmitter of a broadcast station, by communicating through a modem. The subscriber can then select particular video information for display on his own television and also on all televisions tuned to the particular cable channel or broadcast channel utilized by the CATV or television broadcast system by providing a predetermined code to the system's computer via his telephone. Such video information may include graphics, text, music videos, or any other audio or video information. Such audio/video information may be stored on a plurality of suitable storage means, such as a laser disk player, a VCR, other tape storage means, or any other suitable electronic storage means. The method of the present invention also allows an operator of the CATV data processor or separate computer to select video information to be broadcast by entering a digital code corresponding to the desired or selected video information on the keyboard of the control console or computer. The types of information broadcast may be commercial spots, the results of contest polling information, birthday messages, dedications or any other type of messages.

At the beginning of utilizing the inventive method, the program is read into the data processor and started 10. The subscriber's television display screen is then cleared and the display setup 12. The title logo and copyright notice is then displayed 14. The program next determines whether the setup file is on the command line 16. If the setup file is on the command line, the setup file is retrieved from the command line 18. The "Setup" subroutine is then executed 20. If the setup file is not on the command line, then the setup file is set to "TADSET.SET" 22. That functions to put the setup file on the command line. The "Setup" subroutine is then likewise executed 20.

The program then sets up the attached hardware 24. Such hardware may include the modem, a printer, a keyboard or other peripherals. When the hardware is set up, the scroll file is also set up and then read 26. The scroll file contains a menu listing vide information available for viewing by the subscriber. A sample menu listing is shown in Table 1. It may contain music video selections as well as a code for entry by a viewer or system operator for selecting a desired music video or other video information. The program then checks the keys and the modem using the "ISERV" subroutine 28. "ISERV", as will be explained below, allows the program to access a subscriber's telephone by modem or to receive commands from the CATV or the system computer console keys or keyboard.

The program then clears the recursion control variable 30. That step merely makes sure that the variables are set to their lowest level. The "Script" subroutine 32 is then executed. At this point, the "Script" subroutine runs only the "Default" command. Those "Default" commands are executed before the viewer makes a selection. The program then determines whether the "Default" command is valid 34. Such "Default" commands result in the television screen of the viewers displaying instructional messages, form example, the cost of each selection, the selections available and instructions for using the subscriber's telephone keypad in order to make a selection. This inventive method may also display this information while other video information is displayed, such as a scrolling list of the video programs available, together with their selection codes. If the "Default" command is valid, then the program returns to A and once again checks the input from the subscriber's or viewer's telephone 28. If the "Default" command is not valid, the program then displays the error and requests a new "Default" file 36. The program then returns to A and once again checks the input from the subscriber's or viewer's telephone 28.

Figure 2:
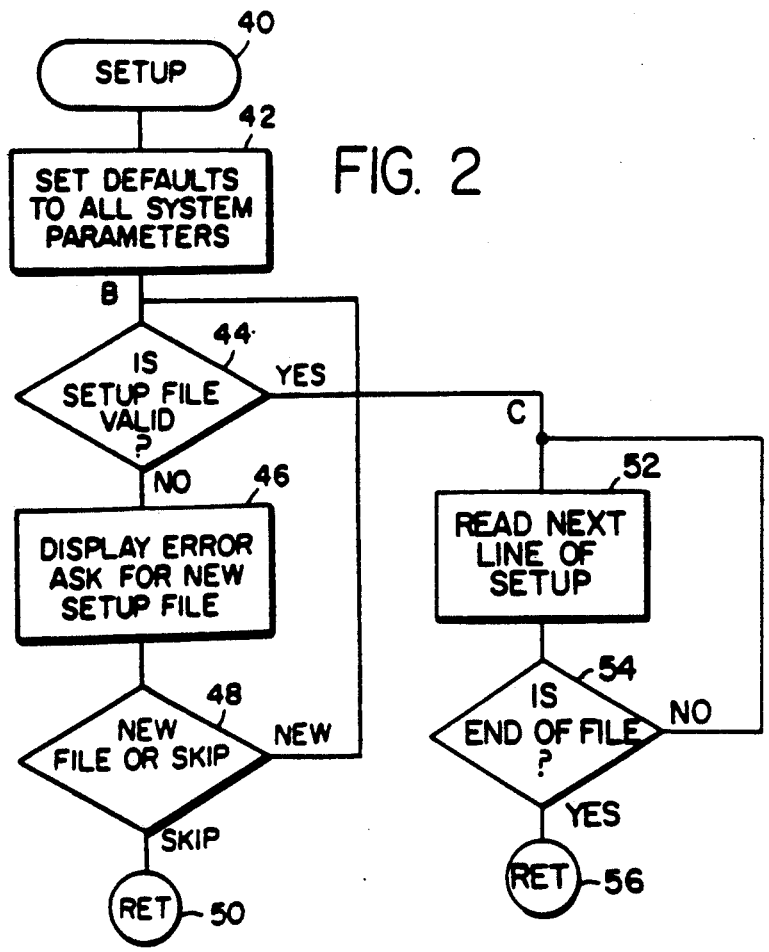
FIG. 2 is a flow chart showing the functional steps of the "Setup" subroutine of the present invention.

Referring now to FIG. 2, which illustrates the "Setup" subroutine, when it is determined that the setup file is on the command line, the file is passed to the "Setup" subroutine 40, the program first sets defaults to all system parameters 42. Next, the program determines if the setup file is valid 44. If the setup file is not valid, an error is displayed and the computer asks for a new setup file 46. A determination is then made whether it is a new file or a skip 48. If it is a skip, the program then returns to the calling program 50. If it is a new setup file, the program returns to B and once again determines whether the setup file is valid 44. If the setup file is valid, the program then reads the next line of the setup file 52 and determines whether it is the end of the file 54. If it is the end of the file, the program returns to the calling program 56. If it is not the end of the file, the program returns to C and once again reads the next line of the setup file 52.

Figure 3:
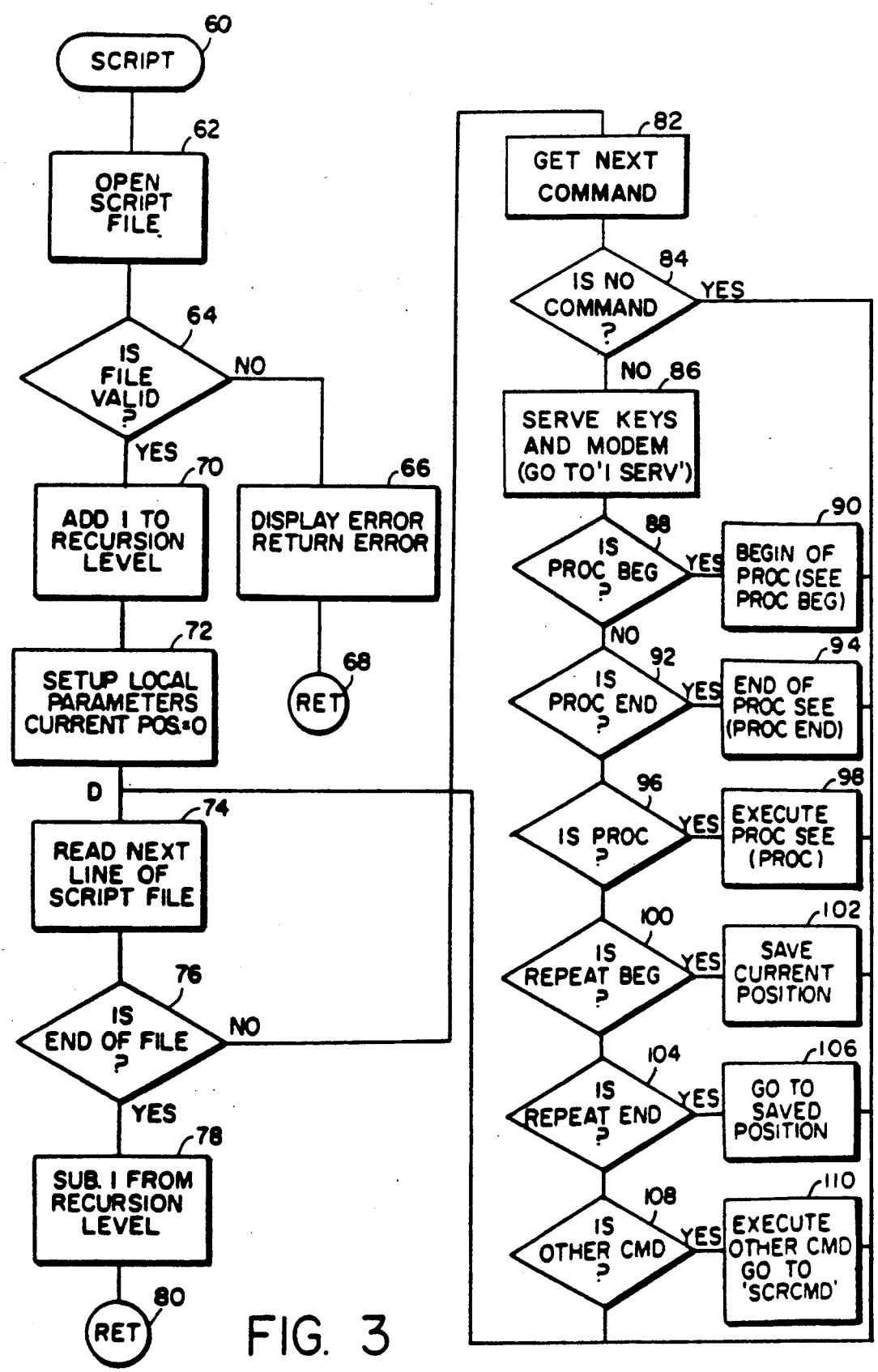
FIG. 3 is a flow chart showing the functional steps of the "Script" subroutine of the present invention.

Referring now to FIG. 3, which illustrates the "Script" subroutine 60, when the recursion variables are cleared 30, the script subroutine is called 32. The program first opens the script file 62 and determines whether the file is valid 64. If the scrip file is not valid, an error is displayed and the "Script" subroutine returns to the calling program 68. If the file is valid, one is added to the recursion level 70 and the local parameters are set up 72. The current position, for example, is set to zero. The program then reads the next line of the script file 74. A determination is next made as to whether it is the end of the file 76. If it is the end of the file, then one is subtracted from the recursion level 78 and the "Scrip" subroutine returns to the calling program 80. If it is not the end of the file, then the program gets the next command 82. A determination is next made as to whether there is no command 84. If there is no command, the program returns to D and once again reads the next line of the script file 24. If there is a command, then the program checks the input from the subscriber's telephone 86. At this point, the "ISERV" subroutine is called 86.

The program next determines whether it is the beginning of a procedure 88. A procedure is a set of rules or steps to be followed in operating equipment in the computer system. If it is the beginning of a procedure, the program then calls the "Proc Beg" (Procedure Begin) subroutine 90. The program then returns to D and once again reads the next line of the script file 74. If it is not the beginning of a procedure, the program then determines whether it is the end of the procedure 92. If it is the end of the procedure, the program calls the "Proc End" (Procedure End) subroutine 94 and returns to D and reads the next line on the script file 74. If it is not the end of a procedure, the program determines whether there is a procedure 96. If there is a procedure, the program executes the "Proc" (Procedure) subroutine 98 and then returns to D to read the next line of the script file 74.

The program next determines whether it is the beginning of a repeat 100. If it is the beginning of a repeat, the current position is saved 102 and the program returns to D and reads the next line of the script file 74. A repeat is a group of commands that are executed repeatedly. If it is not a repeat beginning, the program determines whether it is the end of a repeat 104. If it is the end of a repeat, the program goes to the saved position 106 and then returns to D to read the next line of the script file 74. If it is not the end of a repeat, the program determines whether it is another command 108. If it is another command, the program calls the "SCRCMD" or script command subroutine and then returns to D and reads the next line of the script file 74. If it is not another command, the program returns to D and reads the next line of the script file 74.

Figure 4:
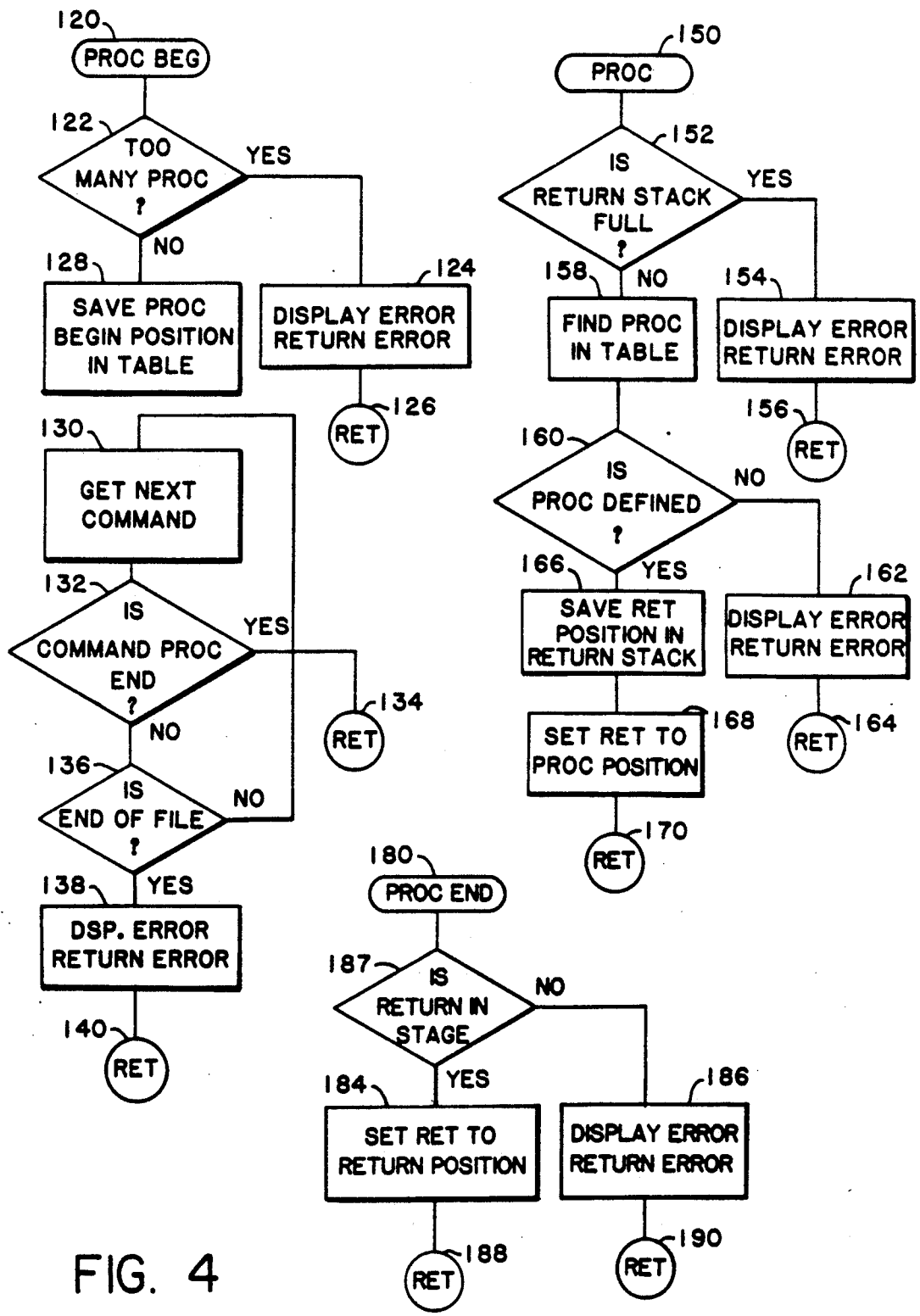
FIG. 4 is a flow chart showing the functional steps of the "Proc Beg", and "Proc" and "Proc End" subroutines of the present invention.

Reference is now made to FIG. 4, which illustrates the "Proc Beg", "Proc End" and "Proc" subroutines. When it is determined by the script subroutine that it is the beginning of a procedure, the "Proc Beg" subroutine 120 is called 90. The program first determines if there are too many procedures 122. If it is determined that there are too many procedures, an error is displayed and the "Proc Beg" subroutine returns to the "Script" subroutine 126. However, if it is determined that there are not too many procedures, the program saves the procedure begin position in a table 128. The program then gets the next command 130 and determines whether that command is a procedure end command 132. If it is a procedure end command, then the "Proc Beg" subroutine 120 returns to the "Script" subroutine 134.

The "Proc" subroutine 150 is called when it is determined that the line in the script file is a procedure 98. The program first determines whether the return stack is full 152. If the return stack is full, an error is displayed 154 and the program returns to the "Script" subroutine 156. If the return stack is not full, then the program finds the procedure in the table 158. It is then determined whether a procedure is defined 160. If the procedure is not defined, an error is displayed on the monitor at the CATV control console 162 and the program returns to the "Script" subroutine. If the procedure is defined, the program saves the return position in the return stack 166. The program then sets the return to the procedure position 168 and returns to the "Script" subroutine 170.

The "Proc End" subroutine 180 is called when it is determined by the "Script" subroutine 60 that the line of the script file is the end of a procedure 94. A determination is then made as to whether there is a return in stage 187. If it is determined that there is a return in stage, the return is set to return position 184 and the "Proc End" subroutine returns to the "Script" subroutine 188. If it is determined that the return is not in stage, an error is displayed 186 and the program returns to the "Script" subroutine 190.

Figure 5:
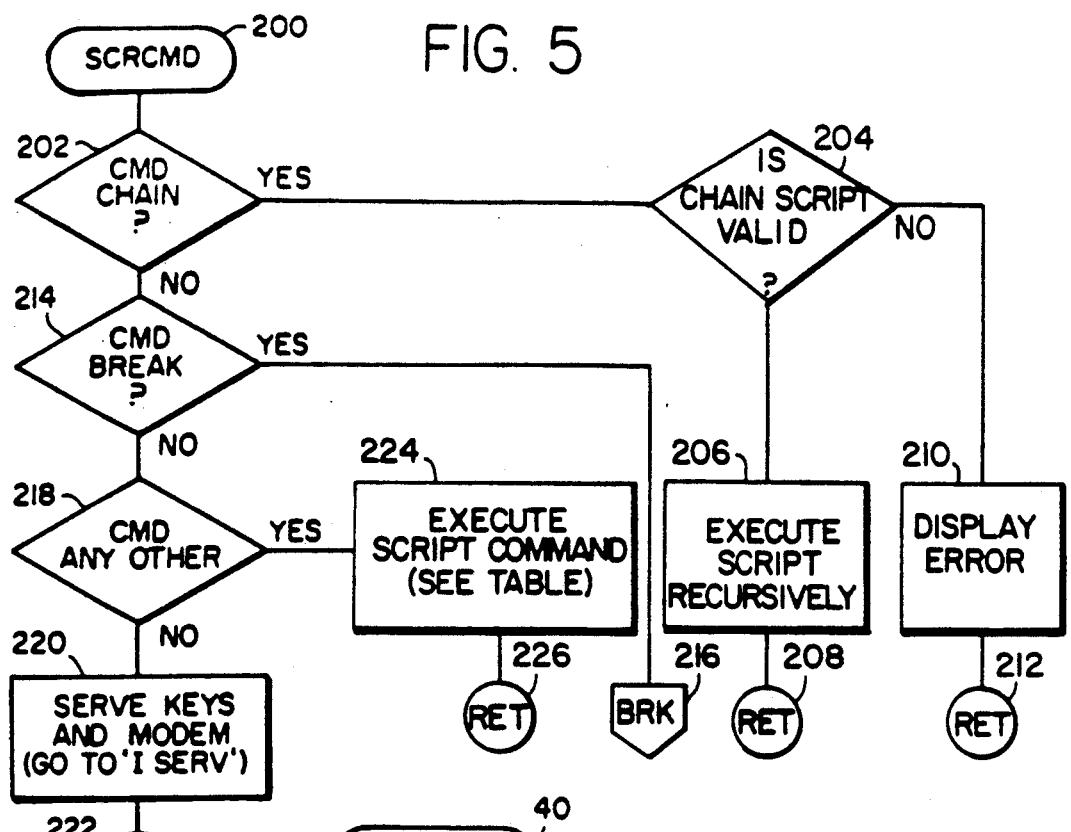
FIG. 5 is a flow chart showing the functional steps of the SCRCMD subroutine of the present invention.

Referring now to FIG. 5, which illustrates the "SCRCMD" subroutine, when it is determined that a line in the script file is another command, the "SCRCMD" subroutine 200 is called 110. The program first determines if the command is a chain command 202. A chain command is a group of logically related commands linked together by a pointer. If the command is a chain command, it is determined whether that chain command is valid 204. If that chain command is found to be valid, it is executed recursively 206 and the program then returns to the "Script" subroutine 208. If the chain command is not valid, an error is displayed 210 and the program returns to the "Script" subroutine 212.

If it is determined that the current line of the script file is not a chain command, the program then asks whether it is a "break" command 214. If it is a break command, the program executes the "BRK" subroutine 216. The break command allows the program to periodically check to see whether the default commands should be stopped because a subscriber of viewer has called in.

If it is determined that the line in the script file is not a break command, the program then determines if it is some other command 218. If it is not another command, the "ISERV" subroutine is executed 220 and the program returns to the "Script" subroutine 222. If it is determined that the current line in the script file is some other command, the command is executed 224. Table I contains a list of a command that the program may execute at this point. The program then returns to the "Script" subroutine 226.

TABLE I

| | |
|---|---|
| Textcolor | Sets the color of the text to be displayed in the scroll and in the current script number displayed. |
| Backcolor | Sets the color of the text background if any is used. |
| Border | Sets the color of the solid border. |
| Row | Sets up the current row cursor position. To be used with Printtext command. |
| Column | Sets up the current column cursor position. To be used with Printtext command. |
| Printtext | Prints string of text at current cursor position. |
| Erasetext | Erases text printed on a certain row. |
| Graphback | Changes graphics background to a certain color. |
| Dispic | Retrieves file as a picture and displays it. |
| LVJB | Selects section of laser disk to be played. |
| LWVJB | Waits for section of laser disk to finish. |
| Delay | Causes a delay for N amount of seconds. |
| Graphonly | Displays graphics only with no video showing. |
| Superimp | Superimposes graphics over video. |
| Vidonly | Displays video only with no graphics showing. |
| Audiocart | Triggers audio cart switch. |
| Videotape | Sends address and begins playing of certain spots on tape machine. |
| Wvideotape | Waits for video tape to complete spot. |
| Audio1 | Activates audio channel one. |
| Audio2 | Activates audio channel two. |
| Switchon | Turns external switch on. |
| Switchoff | Turns external switch off. |
| Modemon | Allows modem to answer. |
| Modemoff | Does not allow modem to answer. |
| Addlog | Adds a number to LG log. |
| Sound | Activates a tone at console. |

Figure 6:
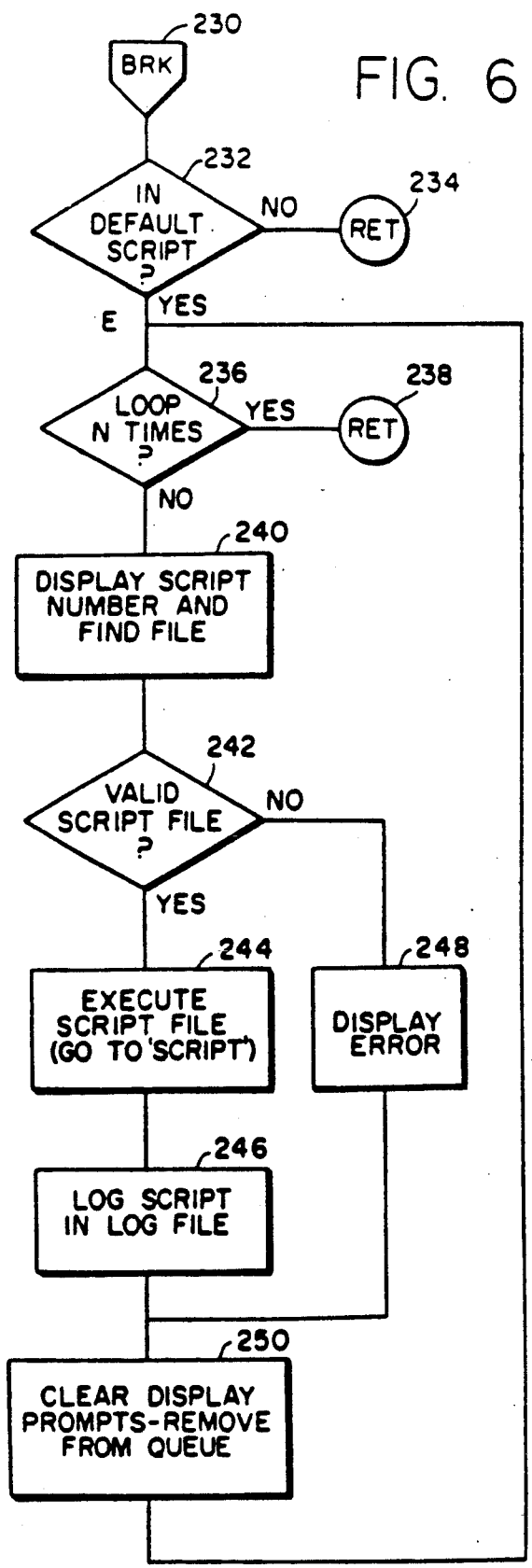
FIG. 6 is a flow chart showing the functional steps of the "BRK" subroutine of the present invention.

Referring now to FIG. 6, which illustrates the "BRK" or break subroutine 230, when it is determined by the "SCRCMD" subroutine that the current command is a break command, the program executes the "BRK" subroutine 216. The program first determines whether the command is in the default script 232. If it is not, then the program returns to "SCRCMD" subroutine 234. The program then determines if it has looped n times 236. If the program has looped n times, the program then returns to the "SCRCMD" subroutine 238. If it is determined that the program has not looped n times, then the script and number is displayed on the television monitor of all subscribers or viewers tuned to the channel and the file or selection requested by the subscriber is found 240.

A determination is then made as to whether the script file is valid 242. If the script file is valid, the script file is executed 244. The script is then logged in a log file 246 and the display prompts removed from the television monitor and the file removed from queue 250. As will be explained below each selected video information is placed in line or on queue to be broadcast after video information previously selected. The program then returns to E and once again determines if it has looped n times 236. If it is determined that the file is not a valid script file, an error is then displayed on the CATV control console 248, the display prompts cleared and the file removed from queue 250. The program likewise then returns to E and determines whether it has looped n times 236.

Figure 7:
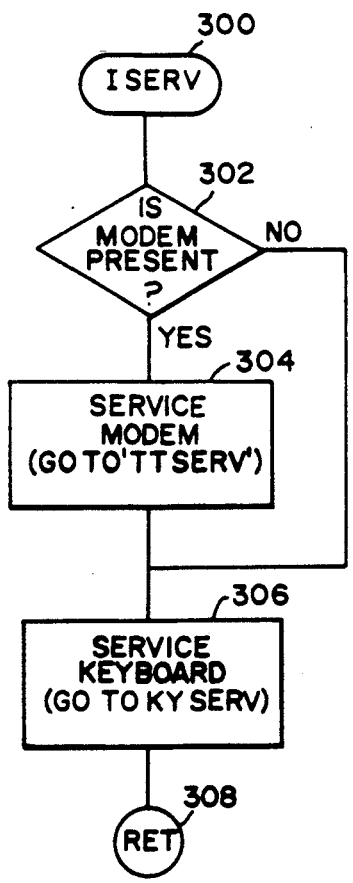
FIG. 7 is a flow chart showing the functional steps of the "ISERV" subroutine of the present invention.

Referring now to FIG. 7, which illustrates the "ISERV" subroutine 300, which is called by the control program after the scroll file is setup and read 28. "ISERV" is called by the "Script" subroutine 60 when it is determined that there is a command 86. "ISERV" is also called by the "SCRCMD" subroutine 200 when a determination has been made that the line of the script file read is not any other command 220. The "ISERV" subroutine first determines whether there is a modem present 302. If there is no modem present, the program next executes the "KYSERV" subroutine 306. If there is a modem present, the "TTSERV" subroutine is executed 304 and then the "KYSERV" subroutine 306 is executed. The program then returns 308 to the control program or the subroutine that called it.

The "TTSERV" subroutine checks to see whether a subscriber has called to make a selection. This subroutine receives selections, processes the selections and places them on queue. The "KYSERV" subroutine checks to see whether an operator at the cable television station or broadcast station has activated a key on the keyboard of the computer 1104 (see FIGS. 23 and 24). A request for display of video information can also be made by an operator using the keyboard. The keyboard also serves as a means of correcting errors and running tests. In the case of a host system, the keyboard also serves as a means for monitoring, controlling and operating a plurality of slave systems, as will be described.

Figure 8:
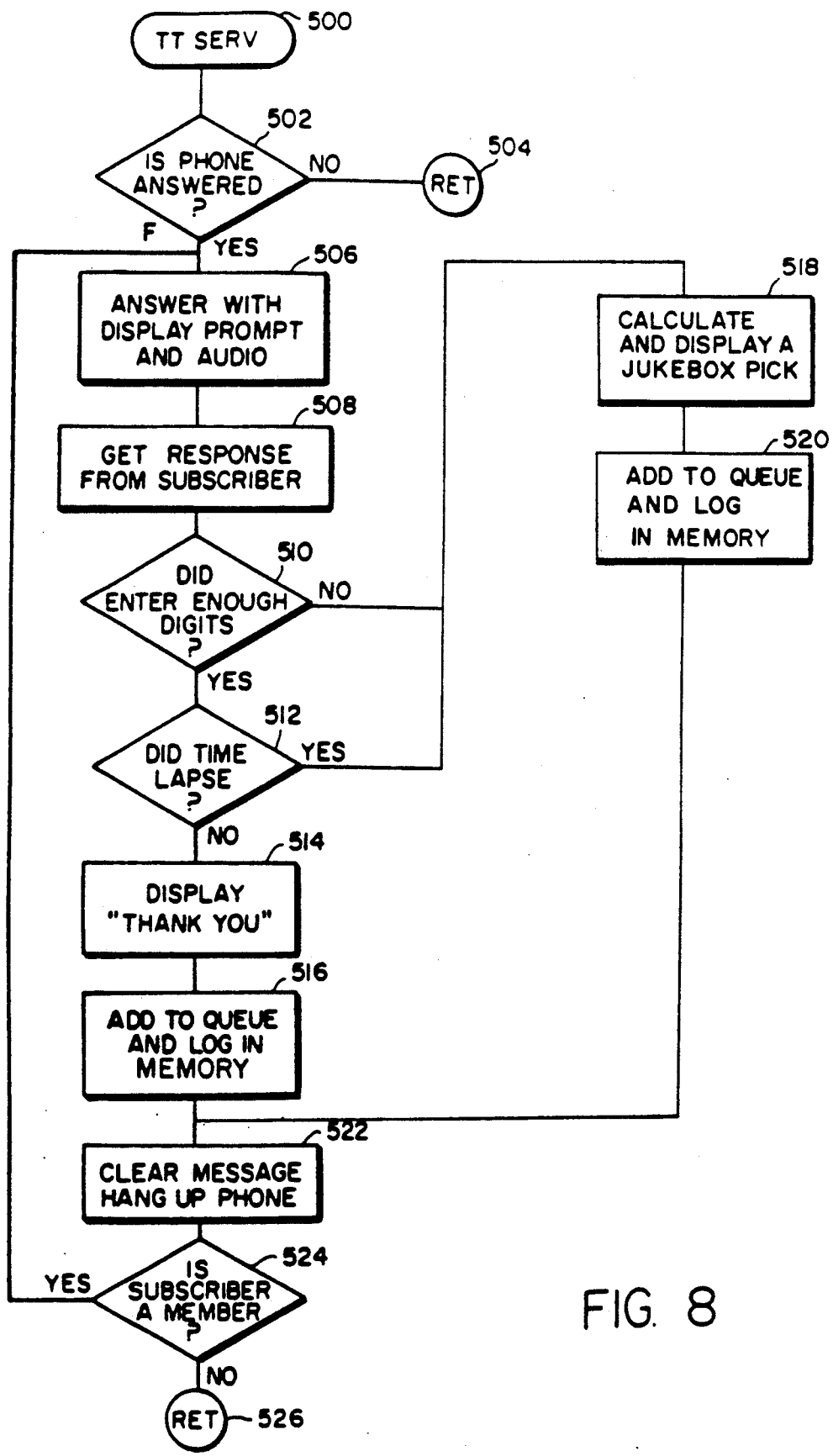
FIG. 8 is a flow chart showing the functional steps of the "TTServ" subroutine of the present invention.

Referring now to FIG. 8, which illustrates the "TTSERV" subroutine 500 which is called by the "ISERV" subroutine when it is determined that there is a modem present 304. A determination is first made as to whether the telephone has been answered 502. If the telephone has not been answered, the program returns 50 to the "ISERV" subroutine 504. If the telephone has been answered, a prompt is transmitted on the channel, is displayed on all television monitors tuned to that common channel or frequency, and the audio turned on 506. In this manner, the inventive method provides confirmation of the viewer's selection through both the selecting viewer's telephone and the television monitor of all viewers. Other audio information may also be provided such as astrological and sports information. In addition, advertising messages may be conveyed.

The program then receives the response of the viewer/subscriber/caller 508. A determination is made as to whether the subscriber has entered enough selection digits 510 to select the desired video information. If it is determined that the subscriber has entered enough digits, a determination is made as to whether the time to enter digits has expired 512. If the time to enter digits has not expired, the words "Thank You" are displayed on all subscribers' television screens 514. The selection of the viewer or subscriber is then added to the queue and logged in a log file 516 in non-volatile memory. The message is cleared from the viewers' screens and the phone hung up 522. It may then be determined whether the subscriber is a club member 524. If the subscriber is a club member, the program returns to F and once again answers with a display prompt and audio 506. It is in this way that the program may give a multiple selection for the price of one. This feature can also be modified by means of a determination of which of a plurality of incoming telephone lines the call is received on, whether the viewer/caller is entitled to make a predetermined plurality of selections, at a higher cost than a single selection. If the subscriber is not a club member, the program then returns to the "ISERV" subroutine 526. The operator of the video selection system described herein may utilize a "900" service of the phone company so that the phone company charges the caller a nominal fee for calling and the operator of the video selection system then receives the majority of this fee.

If it is determined that the viewer did not enter enough digits 510 or that the time to enter digits has expired 512, then the subroutine calculates and displays a Jukebox Pick 518. A Jukebox Pick is a random selection made by the data processor 1104. The Jukebox Pick is then added to the queue and logged in a Log file in non-volatile memory 520. An important feature of the present inventive method is that a line or queue is made of all the video information selected by the subscribers/viewers. Video information is placed o queue with the earlier selected video information preceding the later selected video information. Video information is broadcast on a first-on-queue-first-broadcast basis. The message is then cleared and the phone hung up 522. The subroutine then returns to the "ISERV" subroutine 524.

Figure 9:
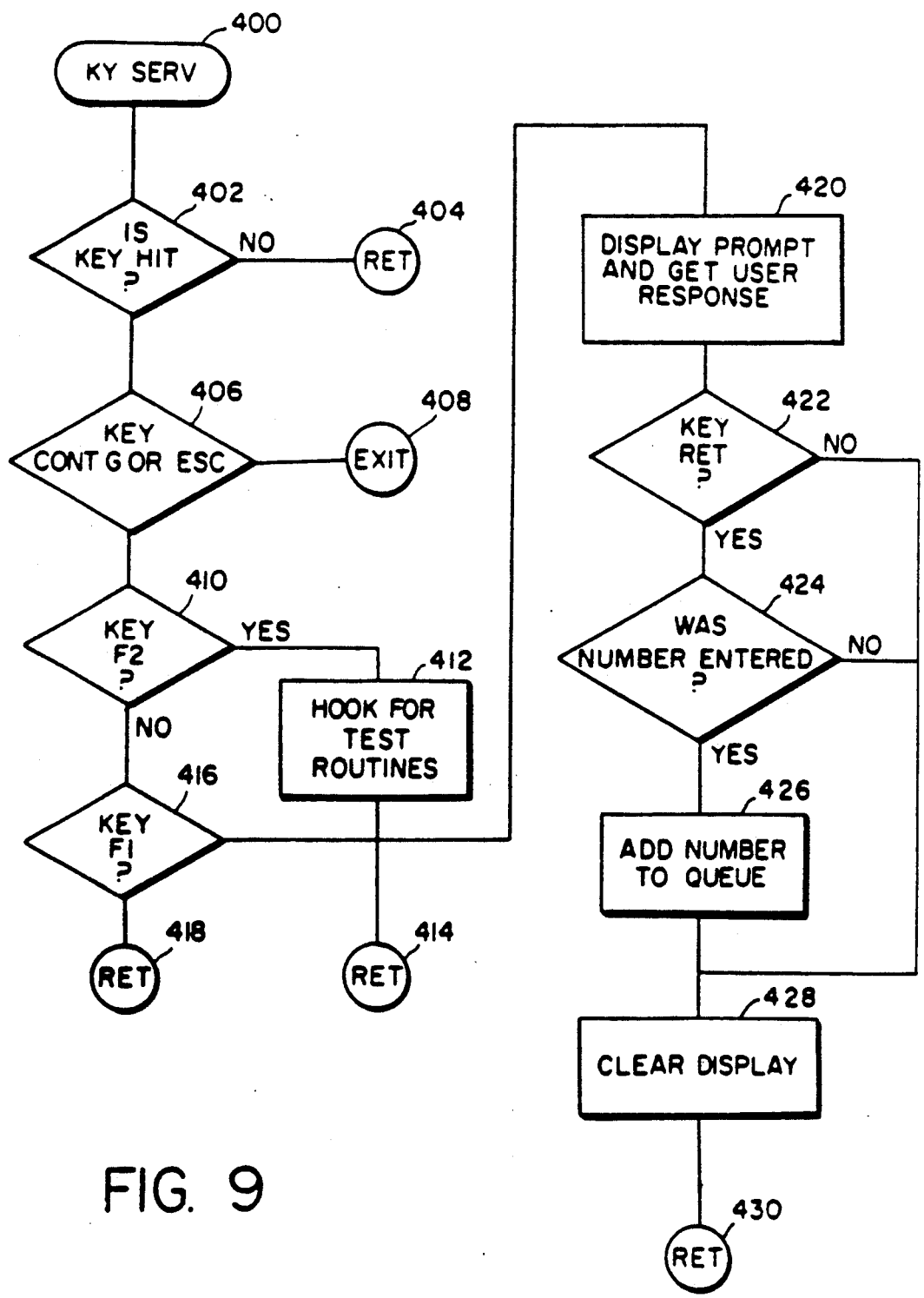
FIG. 9 is a flow chart showing the functional steps of the "KyServ" subroutine of the present invention.

Reference is now made to FIG. 9, which is an illustration of the "KYSERV" subroutine 400 that is called by the "ISERV" subroutine after it is determined that there is no modem present or after the modem has been served 306. The subroutine 400 first determines whether keys on the system keyboard have been actuated 402. If no key has been actuated, the program returns to the "ISERV" subroutine 404. The subroutine then determines whether an escape key has been actuated 406. If an escape has not been actuated, the program exits or ends 408.

However, if no escape key has been actuated, it is determined whether an F2 key has been actuated 410. If an F2 key has been actuated, test routines are executed 412 and the program returns to the "ISERV" subroutine 414.

If it is determined that the F2 key has not been actuated, it is then determined whether the F1 key has been actuated 416. If it is determined that the F1 key has not been actuated, the program returns to the "ISERV" subroutine 418.

If it is determined that the F1 key has been actuated, a prompt is displayed and the user's response obtained 420. The program then determines whether the key actuated was the return key 422. If the return key was actuated, the program determines whether a number was entered 424. If it is determined that a number was entered, the number is added to the queue 426. The display is then cleared 428 and the program returns to the "ISERV" subroutine 430.

If it is determined that no return key has been actuated, the user's display is cleared and the program returns to the "ISERV" subroutine 430.

Figure 10:
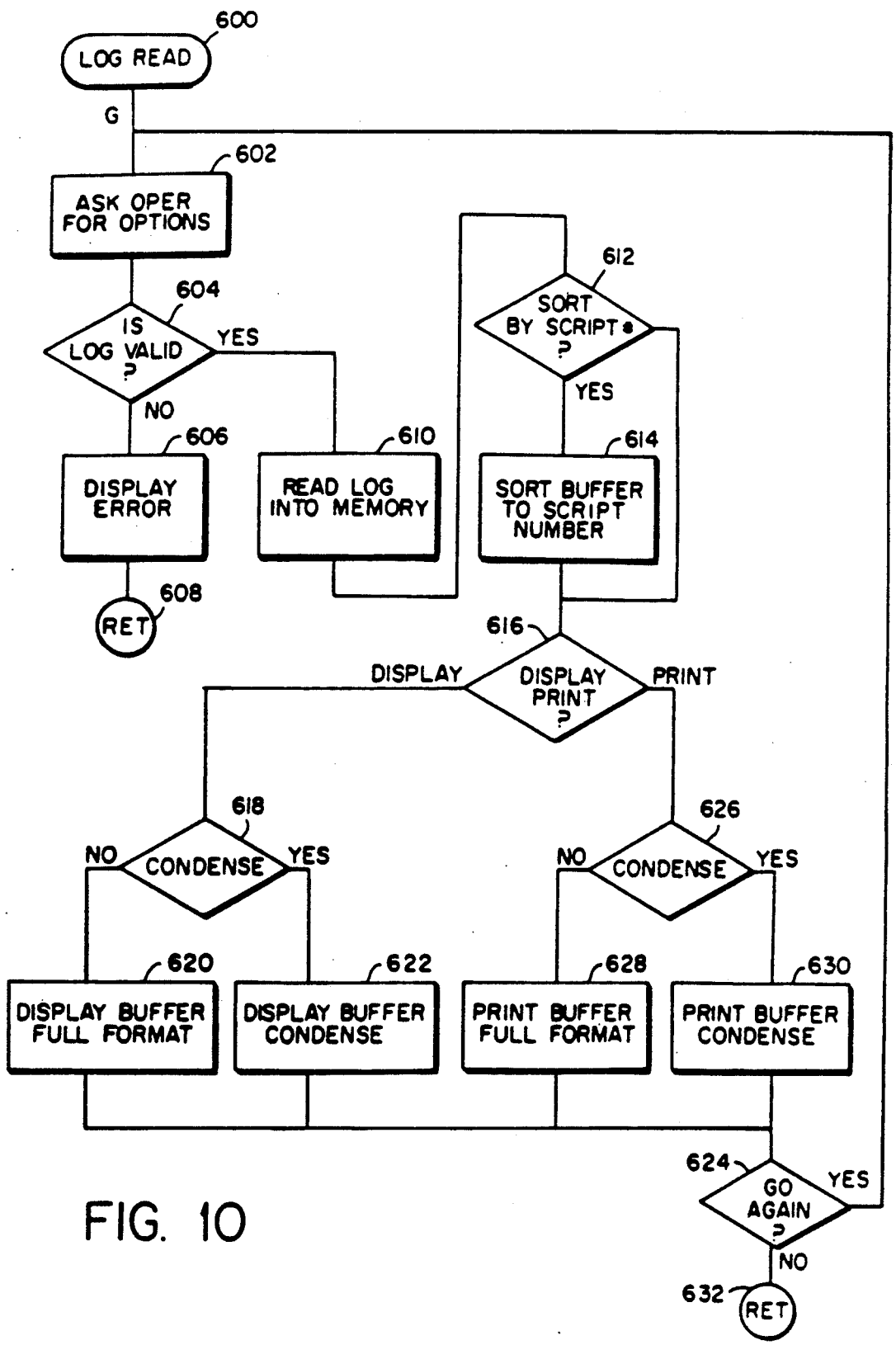
FIG. 10 is a flow chart showing the functional steps of the "Log Read" companion program to the present invention.

Reference is now made to FIG. 10, which illustrates a companion program useful for displaying or printing the contents of log files generated by the inventive method. These log files contain data including an identification of the video information and commercials that have been broadcast and other such useful information. Log files are used primarily by the cable television system or video selection system operator, but may be available to the subscriber or viewer under certain circumstances.

The log file is first read into the data processor 600. The operator or user is then asked for options 602. A determination is then made as to whether the log file is valid 604. If the log file is not valid, an error is displayed 606 and the program returns 608 to G and once again asks for options 602. If it is determined that the log file is valid, then the log file is read into a buffer memory 610. A determination is next made as to whether the log file is sorted by script number 612. If the log file is not sorted by script number, then the buffer contents are sorted by script number 614. After the log file is sorted by script number or if the log file is already sorted by script number, a determination is then made as to whether to print or display the log file 616

If it is determined that the log file is to be displayed a decision is then made whether to condense the log file 618. If it is determined to condense the log file, the buffer contents are then displayed in condensed format 622. If it is determined not to condense the log file, then the buffer contents are then displayed in full format 620.

After the buffer contents are displayed in either condensed or full format, a decision is made whether to repeat the whole process 624. If it is determined that the whole process is not to be repeated, then the program returns to the calling program 632. If it is determined to repeat the whole process, the program then returns to F and once again asks the operator for options 602. If a determination is made to print the log file, a decision is then made whether to condense the log file 626. If it is determined to condense the log file, the buffer contents are printed in condensed format 630. If it is determined not to condense the log file, the buffer contents are printed in full format 628. After the buffer is printed in either format, a decision is made to determine whether the whole operation should be repeated 624. If the whole operation is not to be repeated, then the program returns to the calling program 632. If it is determined to repeat the whole operation, the program then returns to F and once again asks the operator for options 602.

Figure 23:
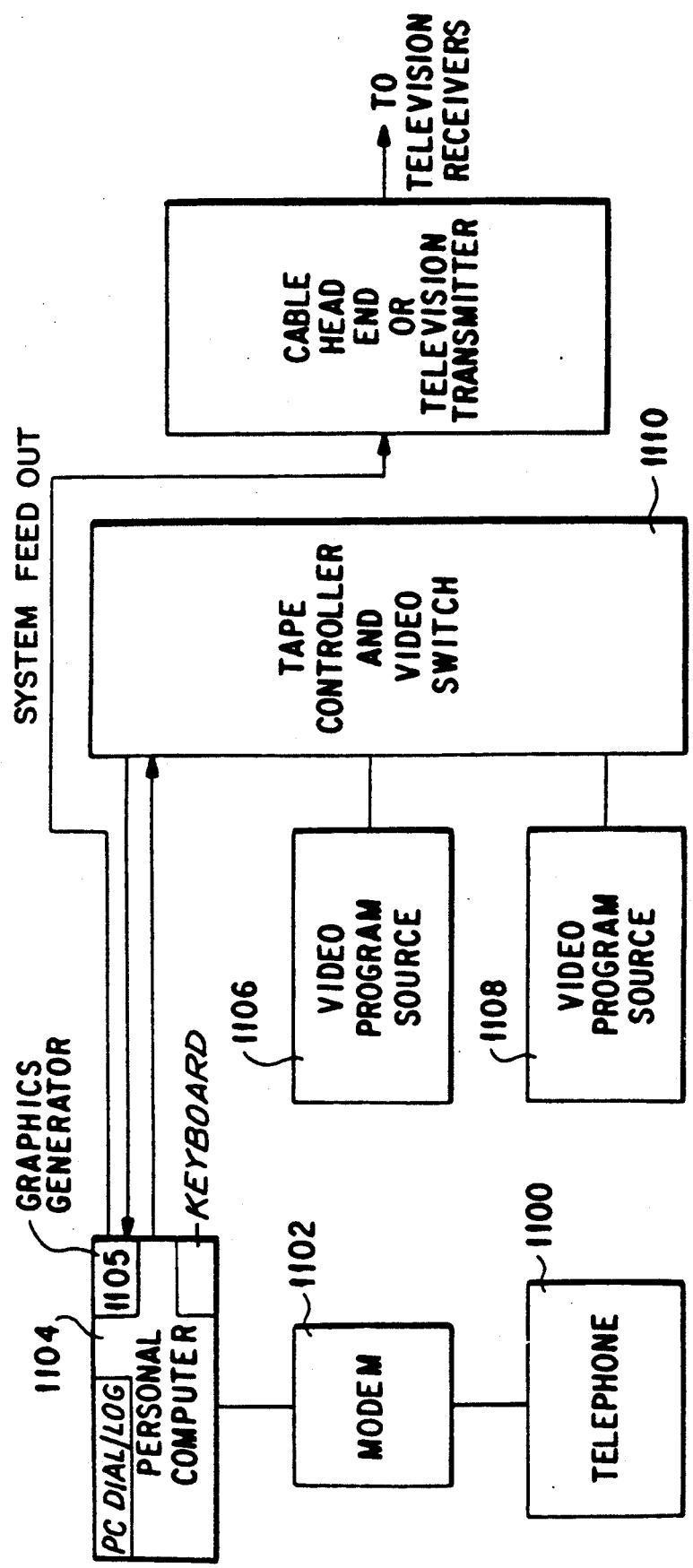
FIG. 23 is a schematic functional block diagram of a hardware system for use with the present invention.
Figure 24:
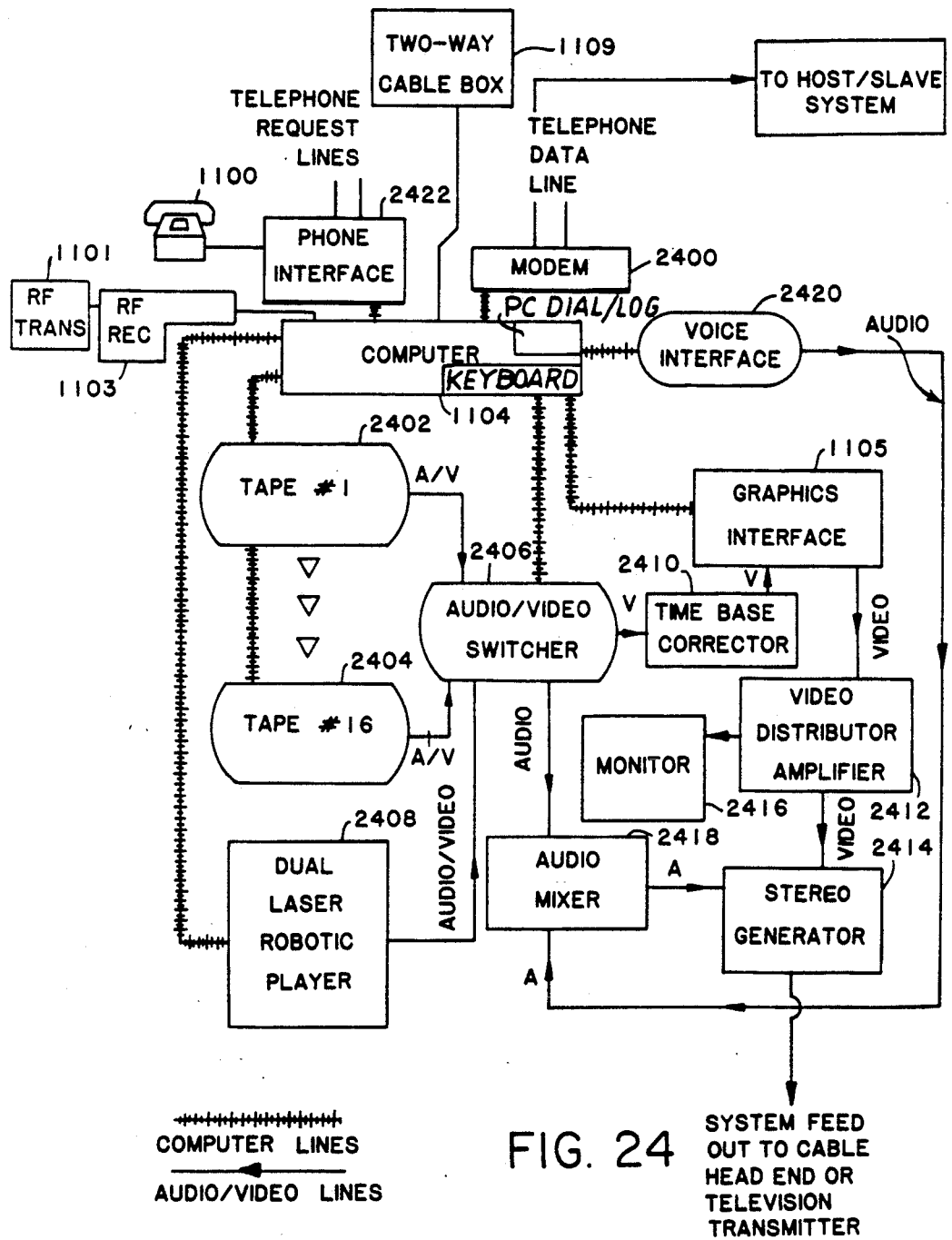
FIG. 24 is a schematic functional block diagram of a preferred alternative hardware system with use with the present invention.

FIG. 11 is a flow-chart showing the functional steps of the message procedure program utilized by a host video selection system such as may be constructed as shown in FIGS. 23 or 24. Once the message procedure subroutine 1120 begins, either command files can be prepared 1122 or audio files can be prepared 1124. After either one or both of the command or audio files are prepared, they are transmitted using the host system 1126 to the slave system which schedules the prepared message to run 1128. After scheduling the messages to run on the slave 1128, the message procedure 1120 is completed 1130 and then returns.

In the manner as described and as shown in FIG. 11, a host system may be utilized to prepare a dedication by typing the dedication information into the host computer, for example, by preparing a command file 1122, preparing an audio 1124 and combining it therewith and then transmitting that prepared file to the slave such that the message, together with the audio, and video, if desired, will be run at the time scheduled by the slave system as requested by the host system. In a similar manner, certain other types of files, for example, video files or other audio files or combinations of both, can be downloaded together with the proper commands from the host system into the slave system and scheduled to run on the slave at any desired time.

Figure 12A:
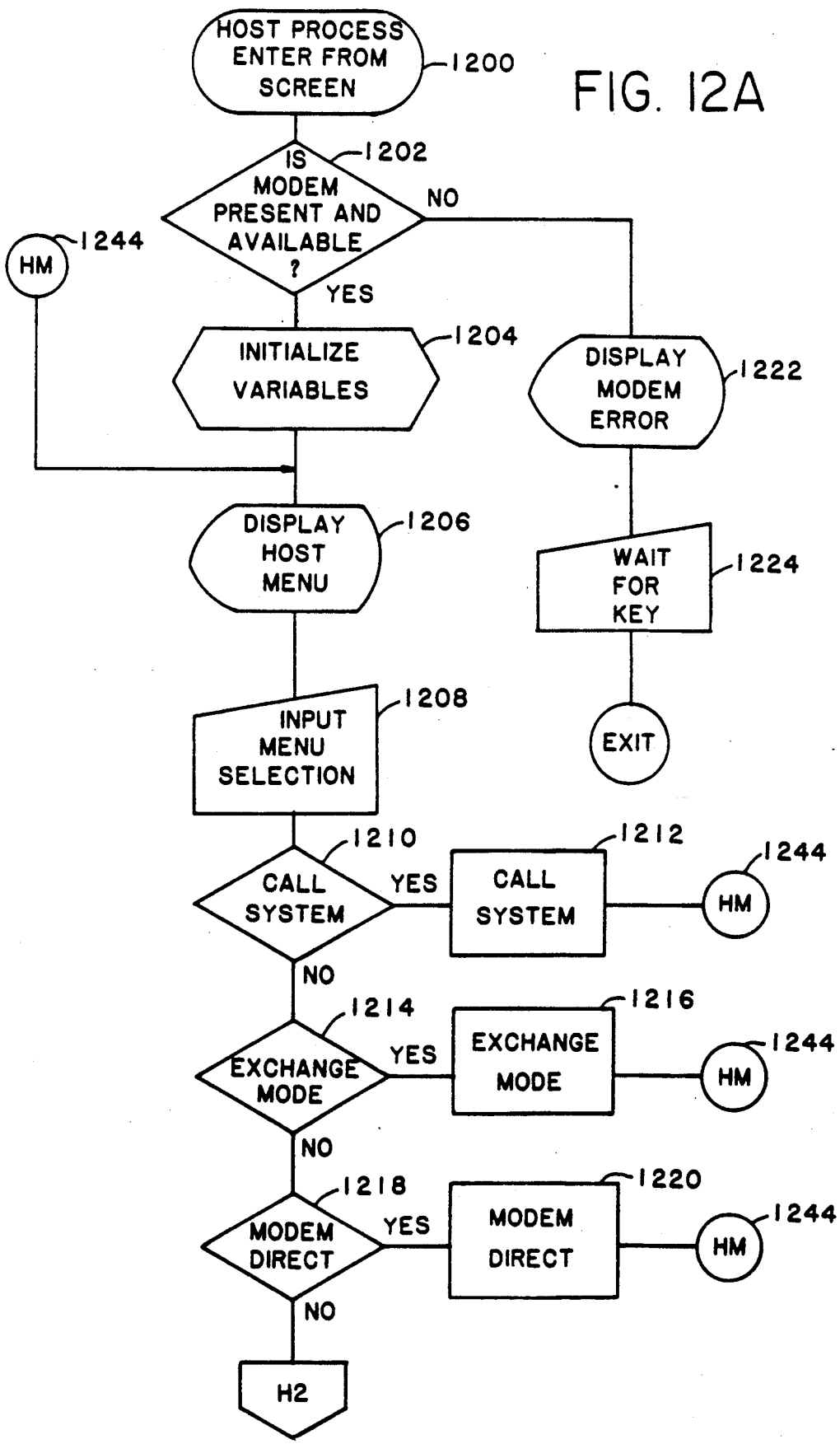
FIGS. 12(A), 12(B), 13-16 are flow charts showing the functional steps and subroutines of the host program used with the present invention.
Figure 12B:
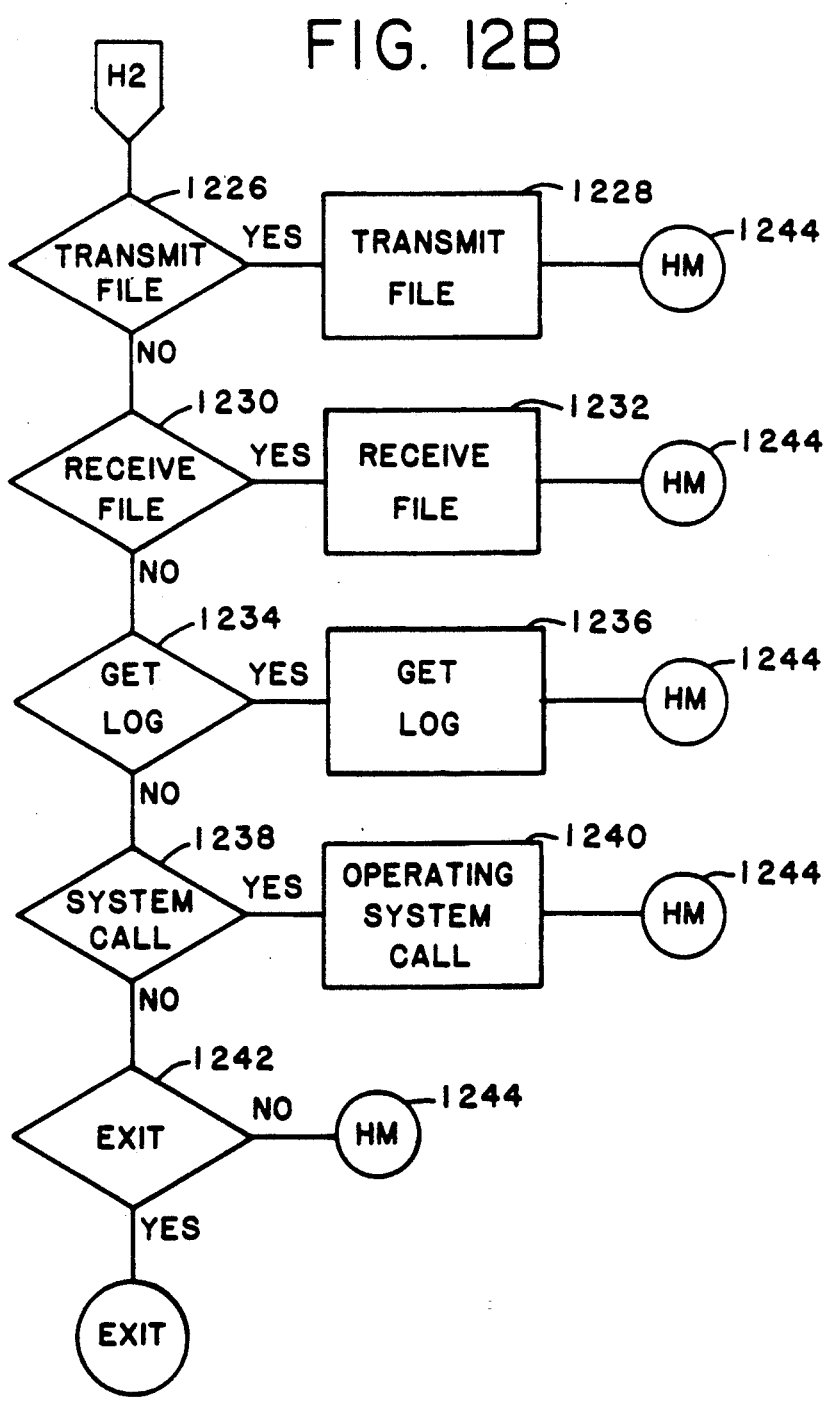
Figure 13:
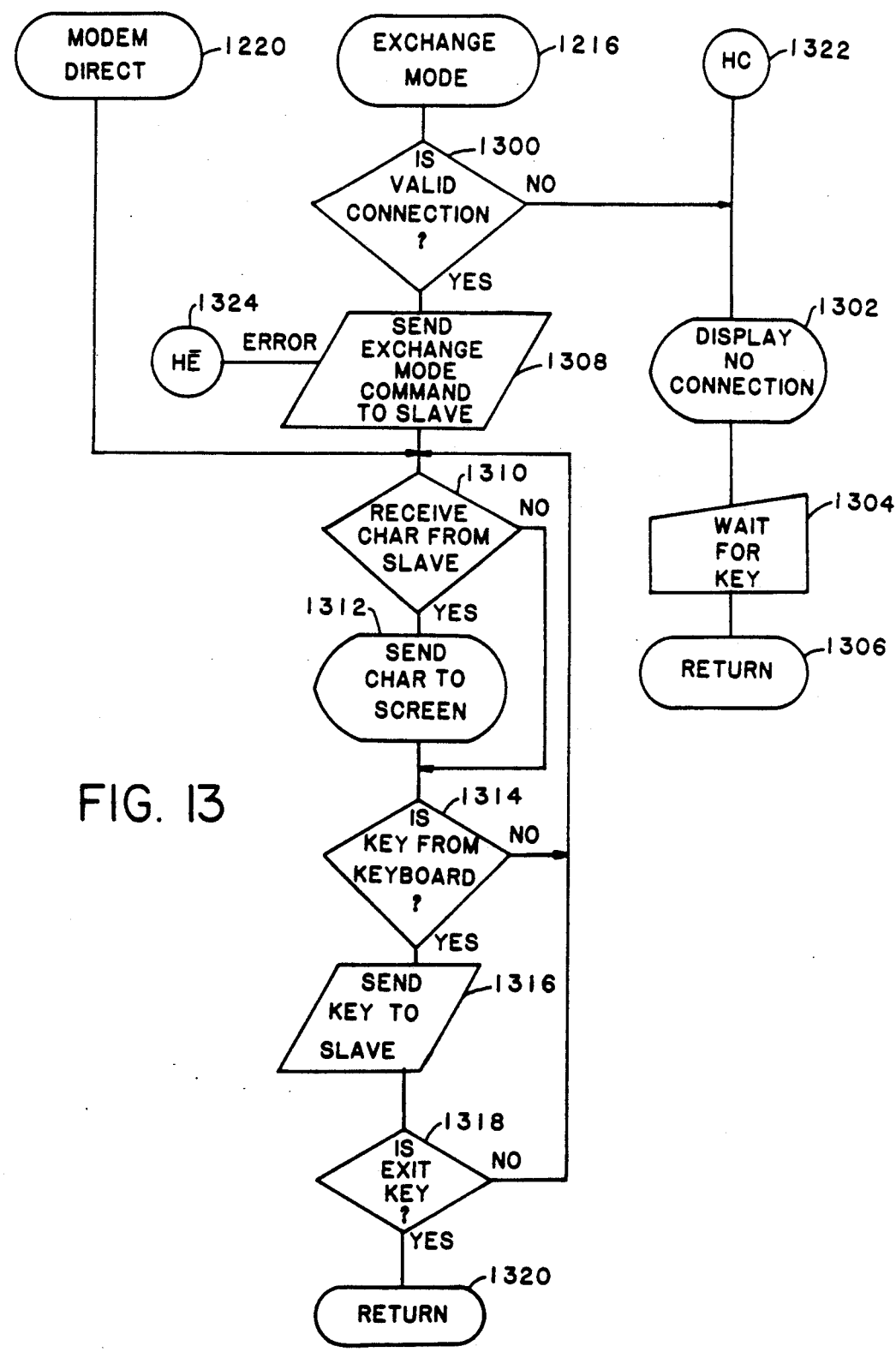
Figure 14:
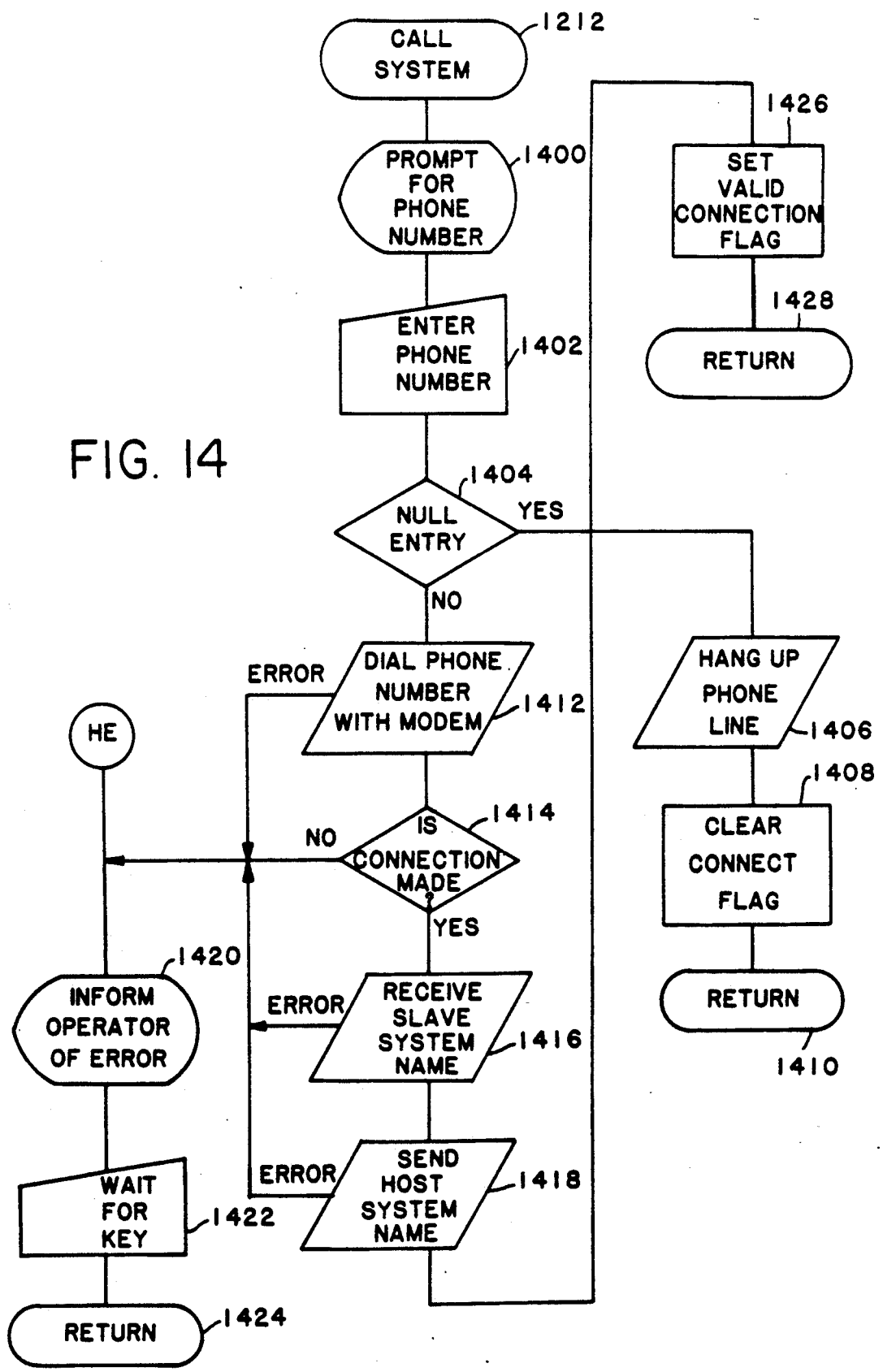

FIGS. 12A, 12B, 13–16 show a flow chart of the functional steps and subroutines of the host program of the present invention. FIG. 12(A) shows the host program which is entered from the screen 1200 which is reached by entering the ALT and F9 keys. A decision is then made whether a modem is present and available 1202. If a modem is present and available, then certain variables such a directory paths are initialized 1204 and then the host menu is displayed 1206 on the monitor of the host system. The user of the host system inputs the desired menu selection 1208 and then a decision is made as to whether the desired menu selection is the "Call System" subroutine 1210. If it is, the program calls the "Call System" subroutine program 1212, which is shown in FIG. 14.

If the input menu item selected from the host menu is not the "Call System" subroutine, then the program determines whether it is the "Exchange Mode" subroutine 1214. If the "Exchange Mode" subroutine has been selected, then the program calls the "Exchange Mode" subroutine 1216, which is shown in FIG. 13.

If the "Exchange Mode" subroutine is not the input menu item selected at step 1208, then the program determines whether the "Modem Direct" subroutine 1220 has been selected 1218. If the "Modem Direct" subroutine 1220 has been selected, then the program calls the "Modem Direct" subroutine 1220, which is shown in FIG. 13.

If the "Modem Direct" subroutine is not called, the program continues. If the query to whether the modem is present and available 1202 is no, then a modem error is displayed 1222 on the monitor of the host system and the program waits for a key to be entered on the keyboard of the host system 1224, which serves to acknowledge that the user has seen the display modem error 1222, and then the program exits.

After a negative determination that the "Modem Direct" subroutine 1220 is the item selected at the input menu selection step 1208, the program determines whether a file is to be transmitted 1226. If the transmit file menu item has been selected, then the "Transmit File" subroutine 1228 is called.

Figure 15:
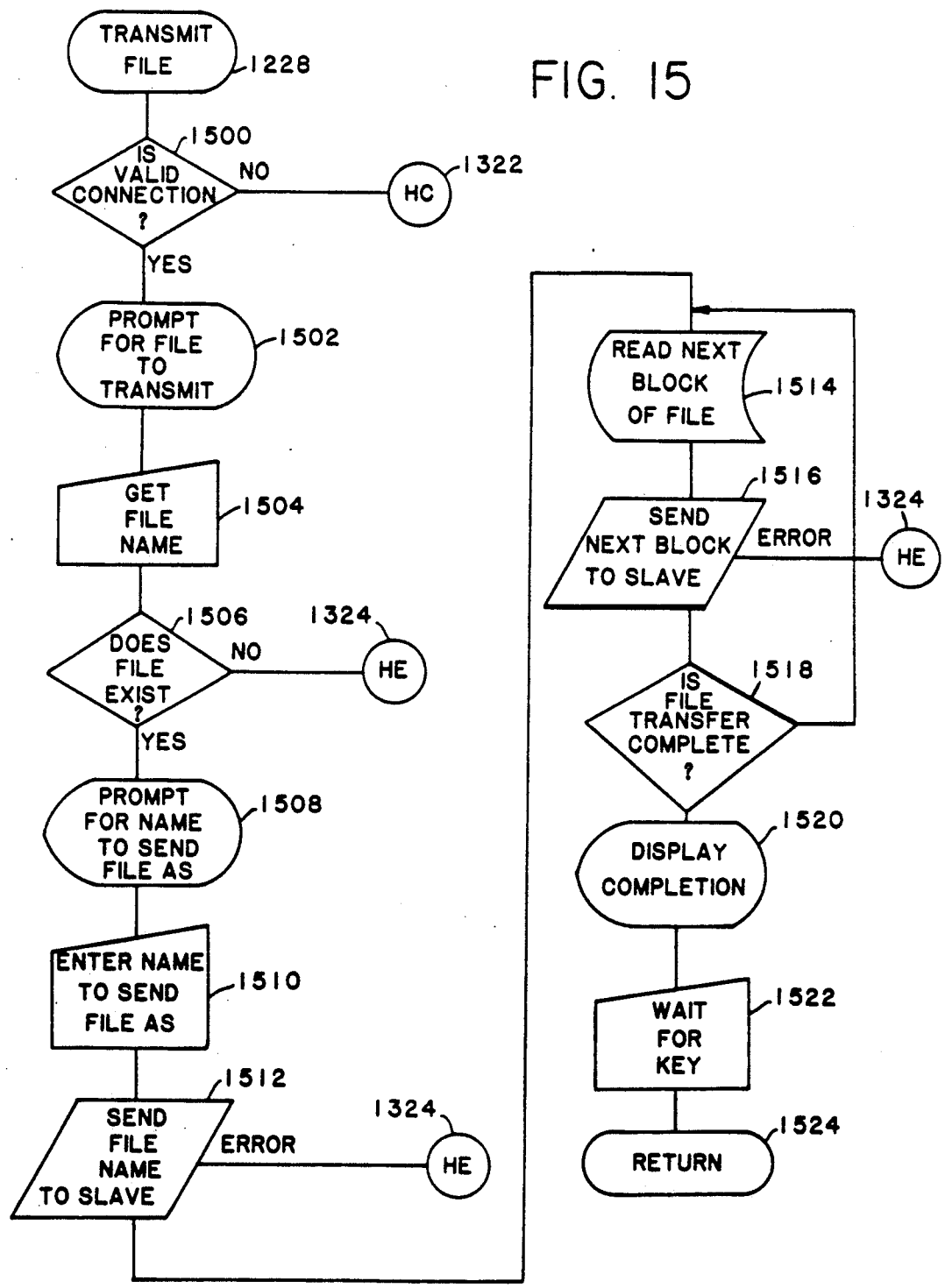
Figure 16:
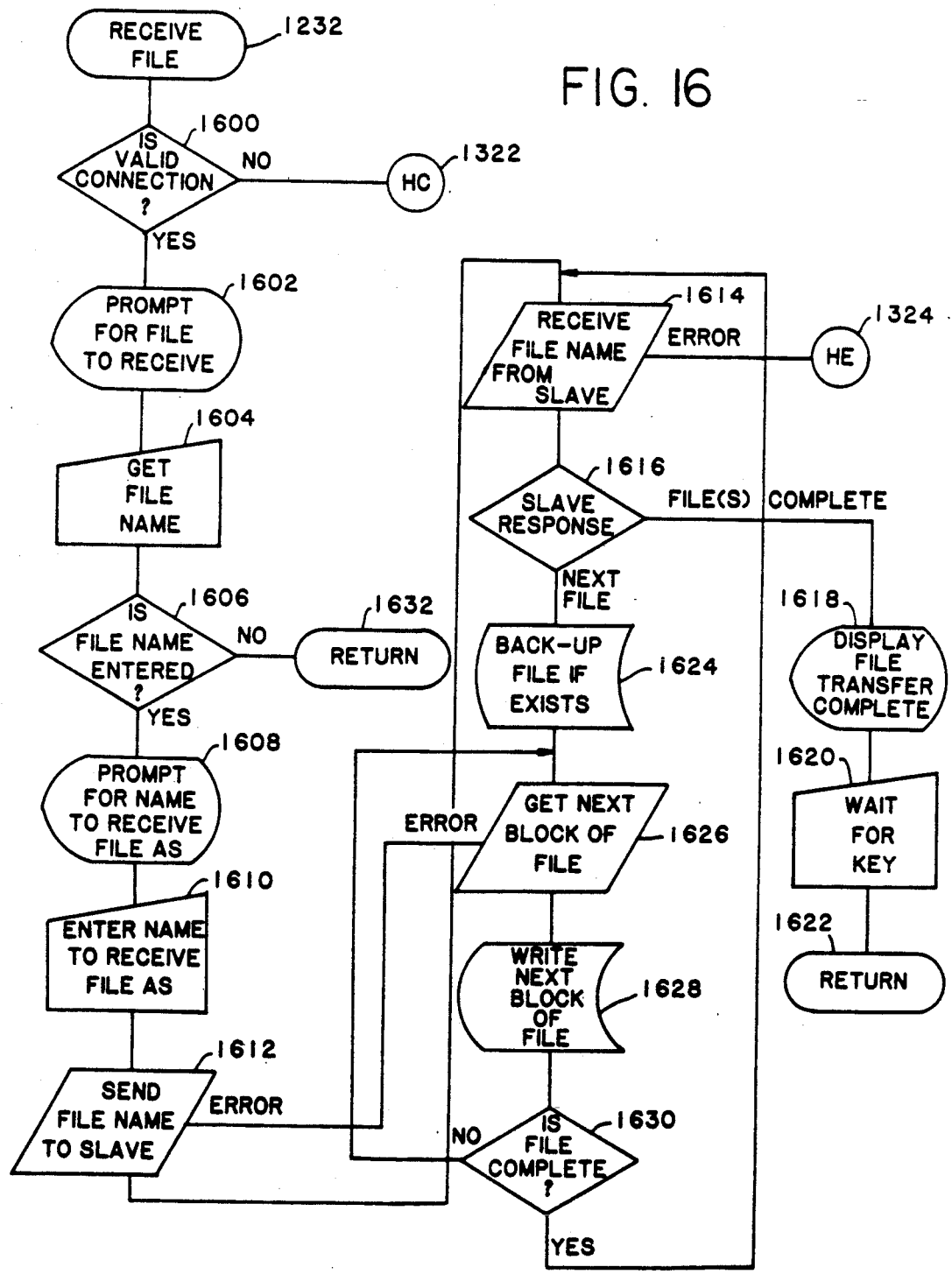

If the "Transmit File" subroutine 1228 is not called, then the program determines whether the menu item selected is the receive file item 1230. If the receive file is selected at the menu selection step 1208, then the "Receive File" subroutine 1232 is called. The "Transmit File" subroutine 1228 is shown in FIG. 15 and the "Receive File" subroutine 1232 is shown in FIG. 16.

Figure 22:
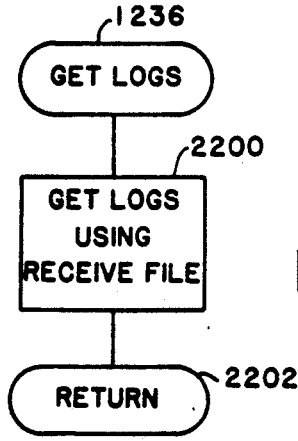

If the program determines that the receive file is not the item selected at the host item selection menu step 1208, then the program queries whether the "Get Log" subroutine 1236 was the item selected 1234. If the "Get Log" subroutine 1236 is selected, then that subroutine is run. The "Get Log" subroutine 1236 is shown in FIG. 22.

If the item selected is not the "Get Log" subroutine, then the system determines whether the item selected at item selection step 1208 is the system call item 1238. If the "System Call" subroutine 1240 is the item selected, then the program calls the operating system 1240. After each of the subroutines 1212, 1216, 1220, 1228, 1232, 1236 or 1240 has been called and completed, the program, through the host main return 1244 returns back to the display host menu step 1206.

In the event that none of the subroutines available in the host menu displayed at step 1206 is chosen at the input step 1208, the program determines whether the selection exit item 1242 has been chosen. If it has not, then the program returns to the host main 1244. If exit is the item selected at the input menu selection step 1208, then the program returns to the message procedure shown in FIG. 11.

FIG. 13 shows the "Exchange Mode" subroutine 1216 and the "Modem Direct" subroutine 1220. The "Modem Direct" subroutine is merely an entry point, as will be described hereinafter in the "Exchange Mode" subroutine 1216. The "Exchange Mode" program allows the exchange of data and commands between the host and slave systems. After entering the "Exchange Mode" subroutine 1216, the determination is made as to whether the connection between the host computer and the slave system is valid 1300. If the connection is not valid, then an error message of "No Connection" is displayed 1302 on the host system monitor and the "Exchange Mode" program waits for the user to enter a key 1304, indicating that he has acknowledged that no connection has been made between the host computer and the slave computer. The program then returns 1306.

If a valid connection has been made between the host computer and the slave computer, then an exchange mode command is sent to the slave computer from the host computer 1308. The program then determines whether a character has been received from the slave 1310. If a character has been received from the slave, which acknowledges the receipt of the exchange mode command by the slave, then that character is sent to and displayed on the screen of the host computer 1312. If it is determined that no character has been received from the slave at decision step 1310, or in the event that a character has been sent to the screen 1312, then a determination is made as to whether a key or character was inputted from the keyboard of the host computer 1314.

If a key is determined to have been inputted from the keyboard of the host computer, then that key is sent to the slave computer 1316. The program then determines whether the key that has been sent to the slave is the exit key 1318. If the key that has been sent to the slave is the exit key, then the program returns 1320. If the key sent to the slave is determined not to be an exit key at decision point 1318 or if no key is determined to have been inputted from the keyboard of the host computer, then the program goes back and again asks whether a character has been received from the slave 1310. It allows the user at the host system to directly access the modem for calling any one of a plurality of slave systems.

The "Modem Direct" subroutine 1320 enters the "Exchange Mode" subroutine 1316 above decision point 1310 and then proceeds in the same manner as described above in connection with the "Exchange Mode" subroutine 1216, beginning with decision point 1310.

FIG. 14 illustrates the functional operation of the "Call System" subroutine or subroutine 1212. A prompt for the operator to enter a phone number is first displayed 1400 on the monitor at the host computer. In response to that prompt 1400, the use enters the telephone number of the particular slave system to be called 1402 and the program determines whether the answered telephone number is a null or incorrect entry 1404. If it is determined that the number entered at step 1402 is a null entry, the program hangs up the accessed phone line 1406, clears the connect flag 1408 and returns to the "Host Process" program 1410.

If it is determined that the phone number entered in step 1402 is correct at step 1404, then the program causes the modem to dial the inputted phone number 1412 and a determination is then made as to whether a connection has been made 1414. If a connection has been made, then a determination is made as to whether the slave system name has been received at the host computer 1416. In the event that an error occurs at step in the dialing of the slave system phone number by the modem 1412 or a connection is not made at step 1414 or an error occurs in the receipt of the slave system name 1416, then the program informs the operator of the error 1420, waits for a key to be depressed by the operator 1422 and then returns upon detecting receipt of that key 1424.

In the event that the slave system name is received with no error at 1416, then the program sends the host system name 1418 and then sets a valid connection flag 1426 so that the host and slave systems are indicated to the host computer to be connected together. The program then returns 1428.

After the host and slave computer systems are connected together by the "Call System" subroutine 1212, the "Transmit File" subroutine 1228 is called. The "Transmit File" subroutine 1228 first determines whether the connection is valid 1500 and, if it is, displays a prompt for the user to input the file to be transmitted 1502. The program waits for the file name to be inputted 1504 and, upon determining that the file name exists in the host computer system 1506, displays a prompt for the name under which the file is to be sent to the slave computer 1508. The program waits for the name of the file as sent to the slave computer to be entered 1510 and then sends the file name to the slave 1512.

Once the file name has been sent to the slave at step 1512, the program reads a block of the file to be sent to the slave 1514 and then sends that block to the slave system 1516. The program then determines whether the file transfer from the host computer to the slave is complete 1518. If it is not, then the next block of the file is read 1514 and sent to the slave 1516 until all blocks of the file have been transmitted from the host computer to the slave. The program then displays an indication of the completion of the sending of the file 1520 from the host to the slave system, waits for an acknowledgment key to be entered by the user 1522 and then returns 1524.

If during the process and operation of the "Transmit File" subroutine 1228, the connection between the host and slave systems, which is preferably made by means of standard telephone lines, is determined to be an invalid connection, at step 1500, then the program enters the host connection mode 1322 and displays a "No Connection" message 1302. The program waits for a key to be inputted 1304 and then returns 1306, as shown on FIG. 13. If at step 1506 the file corresponding to the file name entered at 1504 is determined not to exist or if an error occurs in the sending of the file name to the slave system 1512 or an error occurs in the sending of any block of the file from the host to the slave, the program enters the host error mode 1324 and, as shown in FIG. 13, a new exchange mode command is sent to the slave at step 1308 and the remaining steps of the "Exchange Mode" subroutine 1216 are repeated.

FIG. 16 shows the functional steps of the "Receive File" subroutine 1232 which is used when the host system receives files from the slave computer system. The "Receive Files" subroutine first determines whether the telephone connection between the host computer system and the slave computer system is valid 1600. If the connection is valid, the program displays a prompt for the file name requested to be sent by the slave system 1612. The file name is the name of the requested file on the slave system. At step 1614, the file name from the slave is received and then a decision is made as to whether the files received from the slave are complete 1616. If the files received are complete, that is, the slave has transmitted all of the files requested by the host system, then a file transfer complete legend is displayed on the host computer monitor 1618 and the program then waits for the user to enter a key acknowledging that the file transfer is complete 1620 and the program returns 1622.

If at decision step 1616 it is determined that not all of the files requested by the host have been received, then the file just received is backed-up 1624 and the slave is instructed to get the next block of the requested file 1626 and that next block of file is written into the memory of the host computer system 1628. A determination is then made as to whether the received file is complete 1630. If it is, then the subroutine branches back to step 1614 and determines whether the file name has been received from the slave. If the file is not complete, then the program repeats steps 1626, 1628, and 1630 until all of the current file being transmitted by the slave system to the host system is complete.

As has been similarly described in connection with the "Transmit File" subroutine, if, during the process of receiving a file transmitted from the slave system to the host system the telephone connection fails for some reason, the program aborts and goes into the host connection mode 1322 and performs steps 1302, 1304 and 1306, as shown in and described in connection with FIG. 13. If, during the receiving process, the file name is not entered at step 1606, the subroutine returns to the calling program 1632.

During the receiving process, if an error occurs during the sending of the file name for the file to be transmitted from the slave to the host system at step 1612, then the program jumps to step 1626 and gets the next block of the file. If an error occurs during the receipt of the file name from the slave, then the program enters the host error mode 1324 which causes the program to begin executing the "Exchange Mode" subroutine at step 1308 as shown in and discussed in connection with FIG. 13.

Figure 17A:
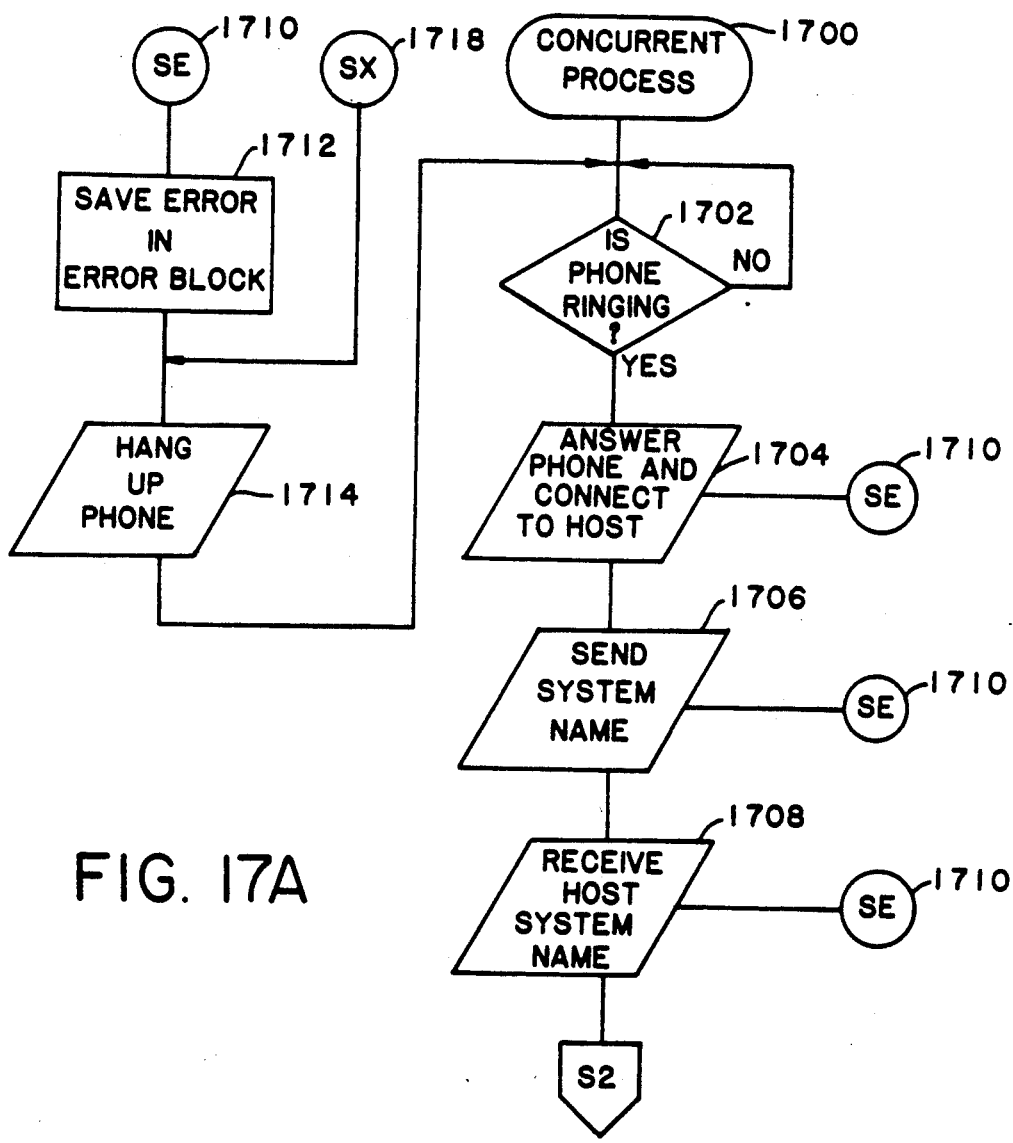

FIGS. 17(A), 17(B), 18-22 are flow diagrams showing the functional steps of the programs in the slave computer system for use in conjunction with the host computer system programs described in connection with FIGS. 11, 12(A), 12(B), 13-16. As shown in FIG. 17(A), by means of the "Concurrent Process" subroutine 1700, the slave computer system continually monitors an incoming telephone line which is used solely by the host system to access the slave system for performing, monitoring, control, and operating functions. A decision is first made as to whether the phone line contains a ringing signal 1702. If there is no ringing signal on the incoming phone line, then the program merely recycles back and continually monitors the phone line until there is a positive response to the query whether the phone is ringing 1702. Once a positive response is received at decision step 1702, the slave system answers the phone and connects itself to the host system 1704. The slave system then sends its name to the host system 1706 so that the host system is able to determine which of a plurality of slave systems it is in communication with. The slave system then receives from the host system the host system name so that the slave system knows which host, in the event there is more than one host system it is dealing with 1708. In the event of an error in any of the steps 1704, 1706 or 1708, the slave, by means of the "Concurrent Process" subroutine, enters a slave error mode 1710 which causes it to save the error in an error block memory 1712 and to hang up the phone 1714, thus disconnecting itself from the host computer system. The program then again returns to the decision step 1702 to determine whether the phone is ringing 1702.

Once the slave computer system has received the host system name at step 1708, it then determines whether it has received a command from the host 1716. In the event of a loss of the telephone connection between the slave system and the host system at step 1716, the slave system enters a connection loss mode 1718, hangs up the phone 1714 and then returns to the decision step 1702 to again determine whether the phone is ringing.

If a command is received from the host system by the slave system, the slave system then determines whether that command has instructed it to enter the monitor mode 1720. If it has, the slave system enters the "Slave Monitor Mode" and runs the slave monitor mode subroutine or subroutine 1722. That "Slave Monitor Mode" subroutine 1722 is shown in FIG. 18.

If the command received from the host at step 1716 by the slave system is not a command to enter the slave monitor mode, then the program determines whether the command is one which instructs it to receive files from the host 1724. If the command received from the host system at step 1716 is one which instructs the slave system to receive files from the host then the program calls the "Receive Files From Host" subroutine 1726. The "Receive Files From Host" subroutine 1726 is shown in FIG. 19.

Figure 20:
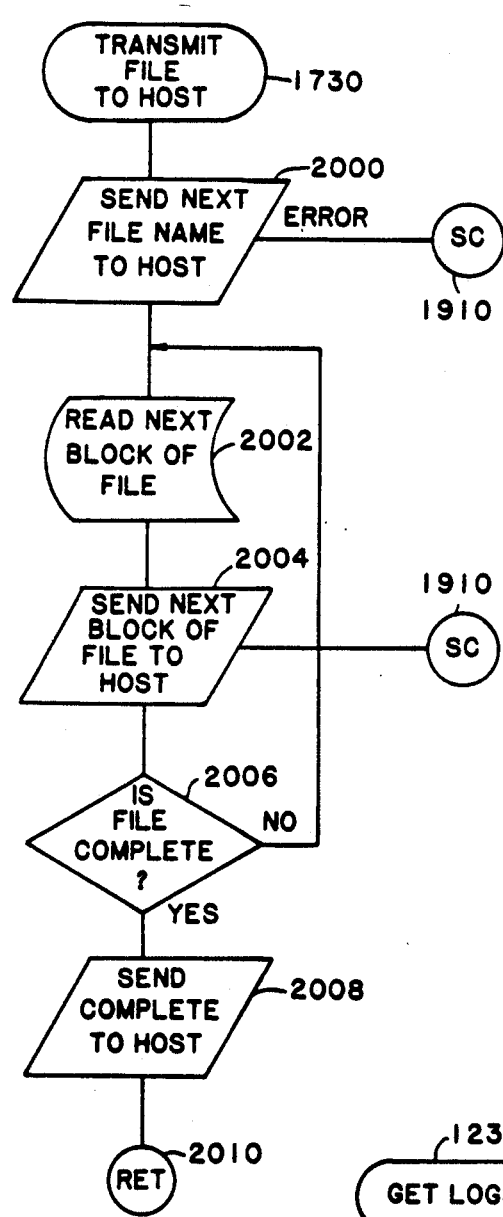

If the command received from the host at step 1716 is not a command instructing the slave that is to receive files from the host system, then the program then determines whether the command received is one which instructs the slave system to transmit files to the host 1728. If the command received by the slave system is one which instructs the slave system to transmit files to the host, then the program calls the "Transmit Files To Host" subroutine 1730. The "Transmit Files To Host" subroutine 1730 is shown in FIG. 20.

If the command received from the host by the slave computer system at 1716 is not a monitor mode command, a receive files to host command or a transmit files from host command, then an error has occurred and that error is saved in an error block memory 1732 and the program branches back to the receive command from host step 1716. Further, after executing the "Slave Monitor Mode" subroutine 1722, or the "Receive files or Transmit Files To Host" subroutines 1726 and 1730, respectively, the program branches back to the receive command from host step 1716 to await a further command from the host system.

FIG. 18 shows the "Monitor Mode" subroutine 1722. The program first causes a flag to be set to send the current display of the slave system to the host system 1800. A determination is then made as to whether the slave system is on the main status screen 1802. If it is determined that the slave system is on the main status screen, then the status screen of the slave system is redisplayed 1804. If it is determined that the slave system is not on the main status screen, or after the redisplay of the status screen 1804, the program then determines whether the connection between the slave system and the host system is still a valid connection 1806. If the connection between the host and slave systems is still a valid connection then a determination is made as to whether an exit key has been received from the host 1808. If no exit key has been received from the host, the program branches back to determine whether the connection is still valid 1806.

If an exit key has been received from the host at step 1808, the "Monitor Mode" subroutine 1722 clears the flag it set to send the slave system display to the host 1810 and returns 1812.

FIG. 19 shows the functional steps of the "Receive Files From Host" subroutine 1726. Upon being called, the "Receive Files From Host" subroutine 1726 backs up the file to be received if it exists 1900. The "Receive Files From Host" subroutine then receives the next block of the file transmitted by the host system 1902 and writes that received block of the file into its memory 1904. A determination is then made whether the file received is complete 1906. If the file received from the host computer system by the slave system is not complete, then the program branches back to receive the next block of the file from the host 1902, writes that received block of the file into its memory 1904 and then determines again whether the received file is complete 1906. If the receive file is complete, then the subroutine returns to its calling program 1908. If, however, during receipt of a block of the file from the host computer system by the slave system an error occurs, the slave system then enters its slave connection mode 1910 which causes it to branch to the received command from host step 1716 of the "Concurrent Process" program 1700, as shown in FIG. 17b.

FIG. 20 is a flow chart of the logical function steps of the "Transmit File To Host" subroutine 1730. Once the "Transmit File To Host" subroutine 1730 is called, the program sends the next file name it is to transmit to the host 2000. The "Transmit File To Host" subroutine 1730 then reads the next block of the file to be transmitted 2002 and sends that block of the file to the host 2004. A determination is then made whether the file being transmitted has been completed 2006. If not all of the file being transmitted has been transmitted to the host system by the slave system, the program branches and repeats the steps 2002 and 2004, reading the next block of the file from its memory and transmitting that block of the file to the host until all of the file has been completely transmitted to the host. At that point, a complete signal is sent to the host 2008 and the program returns 2010 to the calling program.

Figure 17B:
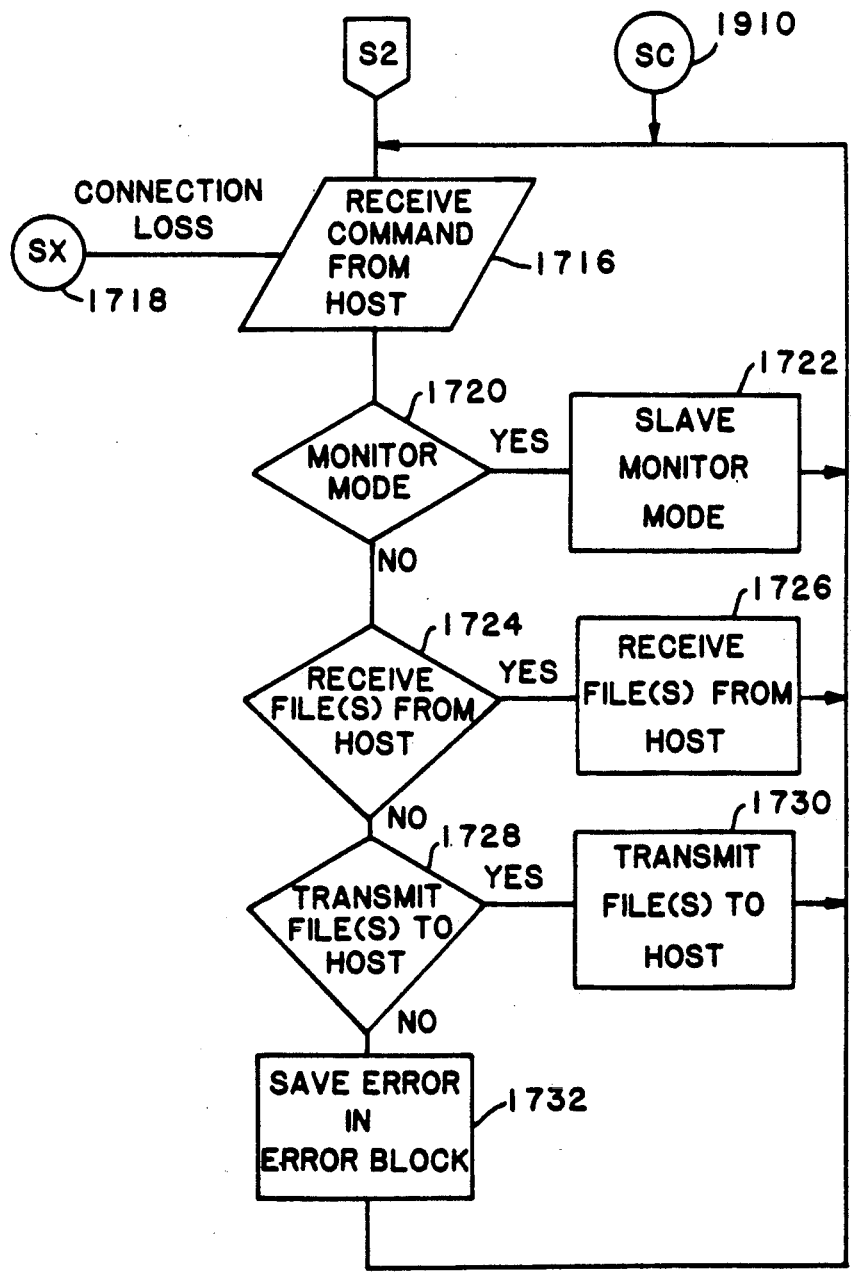

However, if during the sending of the next file name to the host at step 2000 or during the sending of the next block of the file to be transmitted to the host at step 2004 an error occurs, the program enters the slave connection mode 1910 and branches back to the receive command from host step 1716, as shown in FIG. 17b.

Figure 21:
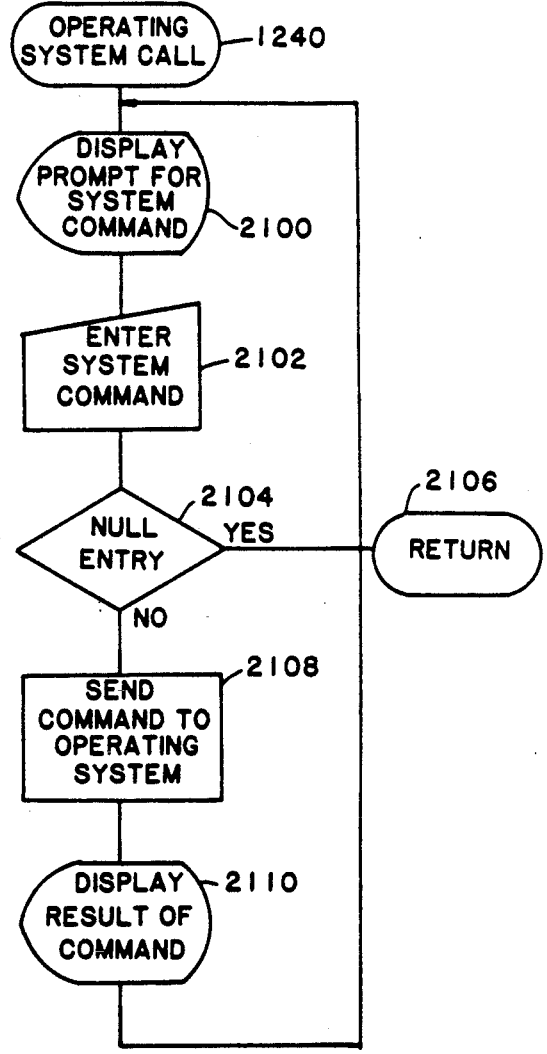

FIG. 21 shows the "Operating System Call" subroutine 1240 which may be accessed from the host computer system "Host Process" subroutine 1200. If the "Operating System Call" subroutine 1240 is called by the host system, the program causes a prompt to be displayed and waits for a Operating system command 2100. It then determines that a Operating system command has been entered by the user 2102 and then determines whether the entered Operating system command is a null entry or a valid entry 2104. If it is determined that the Operating system command entered at step 2102 is a null or invalid entry, then the then the "Operating System Call" subroutine returns to the calling program 2106.

If the Operating system command entered at step 2102 is determined at step 2104 to be a valid command, then that command is sent to the operating system of the host computer system 2108 and the result of that command is displayed in step 2110. The program then branches back to display a prompt to request another system command 2100.

The "Get Logs" subroutine 1236 is shown in functional logic form in FIG. 22. Once the "Get Logs" subroutine 1236 is called, the program gets the logs from the slave system using the receive file 2200 and then returns to the calling program 2202.

FIG. 23 is a functional schematic block diagram of apparatus which may be used with the present invention. The hardware system shown in FIG. 23, using the method disclosed above, may be used to answer a telephone call from telephone 1100 using the modem 1102 and personal computer 1104, as previously described. The caller from the telephone 1100 would then enter a digital code corresponding to the desired selection, as has also been previously described. The programmed personal computer 1104 then directs the tape controller and video switch 1110 to locate the appropriate video program device 1106 or 1108 and the location on that video program device 1106 or 1108 of the selection desired by the caller, as previously described herein. The tape controller portion of the tape controller and video switch 1110 functions to control video tape machines such as those set forth in Table III.

In addition, if a laser video disk player contains the desired selection, then the personal computer 1104 directly actuates that device and causes the output from the laser video disk player to be fed to the video switch portion of the tape controller and video switch 1110. The LVJB and LWVB commands referred to previously are used to control such a laser video disk player.

Once the appropriate video program source has been located and instructed to output the selected video program material, the video switch portion of the tape controller and video switch 1110 operates to transmit the selected video material to the graphics generator 1105. It is then transmitted to the cable television system head end or to a television transmitter 1112 for broadcast over one of the channels of the cable television system or through the atmosphere, respectively, to television receivers.

The menus generated by the computer 1104 are converted to video graphics by the graphics generator 1105 and superimposed on the video signal output from the video controller and video switch 1110. The menus are generated in accordance with the flow charts set forth in FIGS. 3–5.

Examples of the hardware that may be used as components of the hardware system shown in FIG. 23 are set forth in Table II as follows:

TABLE II

Personal Computer 1104

1. Model SMC-70G Microcomputer, which includes an internal graphics generator, manufactured by Sony Corporation;
2. Model PC, XT or AT Microcomputer, manufactured by International Business Machines Corporation; or
3. Any microcomputer which is compatible with the IBM models listed in subparagraph 2 above, manufactured by various companies.

Graphics Generator 1105

1. Models TARGA-8, TARGA-16 or TARGA-32 Truevision advanced roster graphics adapters which are internal to the microcomputers described in subparagraphs b and c; manufactured by American Telephone and Telegraph Company (AT & T);
2. Model ICB Image Capture Board, another internal device for IBM and compatible microcomputers, also manufactured by AT & T; or
3. Model VP-2 Character Generator manufactured by Chyron Video Products, Melville, New York.

Modem 1102

1. PC DialLog manufactured by CMC International, Bellevue, Washington; or
2. Model MS-21T Touch Tone Decoding Host Modem, manufactured by Microperipheral Corporation, Redmond, Washington.

Video Switch and Tape Controller 1110

1. Models CSR-94, CSR-92 or CSR-91, which can control respectively 4, 2, or a single video cassette recorder or player, manufactured by Texscan MSI/Compuvid, Salt Lake City, Utah;
2. VideoLink 232 RS 232 Video Tape Controller, manufactured by BCD Associates, Oklahoma City, Oklahoma;
3. Model VIPc Video Disc/Tape Controller, manufactured by BCD Associates, Oklahoma City, Oklahoma; or
4. Model Autoserter 1 Commercial Insertion System, distributed by Falcone International, Inc., Marietta, Georgia.

Video Program Sources 1106, 1108

1. Model VP-5000 Video Cassette Player, manufactured by Sony Corporation;
2. Model VO-5800 Video Cassette Recorder, manufactured by Sony Corporation;
3. Model VO-5850 Video Cassette Recorder, manufactured by Sony Corporation;
4. Model VP-7000 with BKU-701 RS-232 Interface, Video Cassette Player, manufactured by Sony Corporation;
   VO-9000 Video Cassette Recorder
   VP 9000 Video Cassette Player
   VO 9600 Video Cassette Recorder
5. Model VO-9000 Video Cassette Recorder with BKU-701 RS-232 Interface, manufactured by Sony Corporation;
6. Model VP-9000 Video Cassette Player with BKU-701 RS-232 Interface, manufactured by Sony Corporation;
7. Model VO-9600 Video Cassette Recorder with BKU-701 RS-232 Interface, manufactured by Sony Corporation;
8. Model CR-6650 Color Video Cassette Recorder, manufactured by Victor Company of Japan, Limited;
   Model MDC-30 Laser Disc Random Access Charger Dual Robotic Laser Disc Player manufactured by SY Nikkyo, Robotic Laser Disc Player
9. Model CR-8250U Electron Editing Color Video Cassette Recorder, manufactured by JVC, Victor Company of Japan, Limited;
10. Model LDP-180 Video Disc Player, manufactured by Sony Corporation;
11. Model LDP-2000 Series, Video Disc Player, manufactured by Sony Corporation;
12. Model LD-V4000 Video Disc Player, manufactured

TABLE II-continued by Pioneer Electronic Corporation, Tokyo, Japan;
13. Model LD-V6000 Industrial Laser Disc Player available form Pioneer Video, Inc., Montvale, New Jersey; or
14. Model PR-7820 Video Disc Player, manufactured by MCA, Inc. Company, Carson, California.
15. Model MDC-30 Laser Disc Random Access Changer Dual Robotic Laser Disc Player, manufactured by Nikkyo, Matsudo City, Japan Referring now to FIG. 24, there is shown therein a preferred embodiment of the video information selection system hardware, as it may be configured for either a host system or, more particularly, for a slave system. While the host system may be configured as shown in FIG. 24, only the computer 1104, the modem 2400 and a telephone data line, together with the programs described herein are necessary for a host system if the host system is to serve only as a remote monitoring, operating, and control system and not as a video information selection system. Obviously, a host system may be connected to a plurality of slave systems.

The computer 1104 is connected by means of computer control lines to a plurality of video tape units, of which the first video tape unit 2402 and a sixteenth tape unit 2404 are shown. Such video tape units may be embodied, for example, as any of the video cassette players or recorders disclosed for use as a video program source 1106 or 1108 in connection with FIG. 23. Preferably, Sony Model VP-7000's are utilized. Alternatively, one or more of the video tape sources 2402 and 2404 may be any of the video disk players disclosed in Table II in connection with FIG. 23.

The audio and video output of each of the video tape units 2402 and 2404 is connected to an audio/video switcher which may preferably be a Model No. 10XL available from Grass Valley Group, Grass Valley, Calif. which functions, under control of the computer 1104, to simultaneously or separately switch the audio and video components of the inputs received from any of the video program sources connected in the system, such as the video tape units 2402 and 2404 or the dual laser robotic player 2408. That is, the two audio channels are switched together separately or simultaneously from the switching of the video signal.

The video component of the video program source output signal is sent to a time base corrector 2410 which may preferably be a Model No. FA-200 available from FOR—A Corporation of America, Newton, Mass., which functions to synchronize the video switching between video sources and stabilize synchronizing errors inherent in some video tape players such as the Sony VP-7000. If it is desired to utilize an audio track from one program source with a video program from another program source, they may be submitted separately in the audio/video switcher 2406. Such feature—is useful for preparing commercial spots.

The video output from the time base corrector 2410 is fed to a graphics interface or generator 1105 which is configured to receive text or graphics information from the computer 1104, such as menus, and superimposes that text or graphics information on the video signal input into the graphics interface 1105 from the time base corrector 2410. Thus, the video output from the graphics generator 1105 includes both the video component from the video program source as well as the text or graphics from the computer 1104. The output from the graphics interface 1105 is fed to a video distributor amplifier 2412 which functions to both amplify the input video signal prior to transmitting it to a stereo generator 2414 and also to distribute the amplified video signal to a video monitor 2416 located at the video information selection or slave system. The video monitor is used by the operator of that system for both monitoring the output from the slave or host system as well as for use as a monitor for the computer 1104 in conjunction with the programs described herein.

An additional source of video programs may preferably be a single or dual laser robotic player 2408 as disclosed in Table II, which is connected in a manner similar to the video tape sources 2402 and 2404. That is, under control of the computer 1104, the single or dual laser robotic player 2408 outputs a combined audio/video signal to the audio/video switcher 2406. In the case of a single laser player, any of the laser players set forth for use as the video program source 1106 or 1108 of FIG. 23 may be utilized. In addition, two such laser disk players can be utilized in tandem to provide additional storage.

The audio output from the audio/video switcher 2406 is fed to an audio mixer 2418. The audio mixer mixes the audio received from the video program source devices with the audio received from the voice interface 2420. The purpose of the voice interface 2420 is to convert computer generated digital messages and signals into audio signals which are then mixed in the audio mixer 2418 and output them to the stereo generator 2414 for output together with the video signal received from the video distributor amplifier 2412 as the system feed out to the cable head end or television transmitter. The voice interface 2420 may preferably be a model Votalker IB available from Votrax Inc., Troy Mich.

In operation, a viewer or subscriber wishing to select a video program for display over the single cable channel or television transmission channel, by means of telephone 1100 calls one of a plurality of telephone numbers which, by means of telephone request lines command telephone interface 2422 to the computer 1104 of the slave or host system. The telephone interface 2422 may preferably include a modem 1102, as shown in FIG. 23. Alternatively, as shown in FIG. 24, a combination RF transmitter 1101 at the viewer's location and an RF receiver 1103 at the computer 1104 location may be used. Also, a two-way cable box 1109 may be used with a cable system, in a known manner, to allow a cable subscriber to input a selection code to the computer 1104. Such a cable box 1109 may preferably be a Model No. BA-6000, BA-5000N, BT-H510 or BR-100, available from Pioneer Communications of America, Inc., Columbus, Ohio, a STARUVE or STARFONE available from The Jerrold Division of General Instrument Corporation, Hatboro, Pa.

The caller selects one or more video programs by means of inputting one or more selection code numbers over the telephone request line used to connect his telephone to the phone interface 2422. Those telephone codes, which are embodied as DTMF tones are translated into computer signals and fed to the computer 1104. The computer 1104 determines the particular video program source, for example, video tape 1 through video tape 16, or the single or dual laser robotic players, as well as the location on the video program source of the particular video program selected. The computer then instructs the particular video program source to proceed to the storage location of the selected video program material and to output it to the audio/video switcher 2406. At the appropriate time, the computer 1104 instructs the audio/video switcher to output the selected video and audio material received from the video program source.

As described above, the video component of the signal is output to a time base corrector 2410 and then through a graphics interface 1105 where any additional video graphics are superimposed on the video source signal. After amplification by the video distributor amplifier 2412, the video is fed to the stereo generator 2414.

The audio signal output from the audio/video switcher is mixed in the audio mixer 2418 with any additional computer-generated audio signals generated by means of the voice interface 2420, and then output to the stereo generator 2414 which outputs a video signal with stereo audio sound by means of the system feed out to either the cable head end or the television transmitter. All television receivers tuned to the particular cable channel or television channel to which the video information selection system is connected will receive the selected video program material.

As also shown in FIG. 24, multiple incoming telephone request lines are connected by means of telephone interface 2422 to the computer 1104. The telephone interface 2422 may preferably be constructed from telephone couplers, such as multiple PC Dialog devices as set forth in Table II. By means of polling, the computer 1104 is able to determine which telephone request line is ringing. It then answers and services that line accordingly. For example, if one telephone request line is designed to allow the viewer to make only a single selection, for a set charge while a second telephone request line allows the viewer to select three video programs for a set but different charge, then the computer is able to differentiate between the two (or more) telephone request lines so that an appropriate number of selections can be serviced.

The system of FIG. 24 is also provided with a modem 2400 which is connected between the computer 1104 and a dedicated telephone data line. The modem 2400 and the connected telephone data line are utilized for communications between the host and slave systems.

Figure 25A:
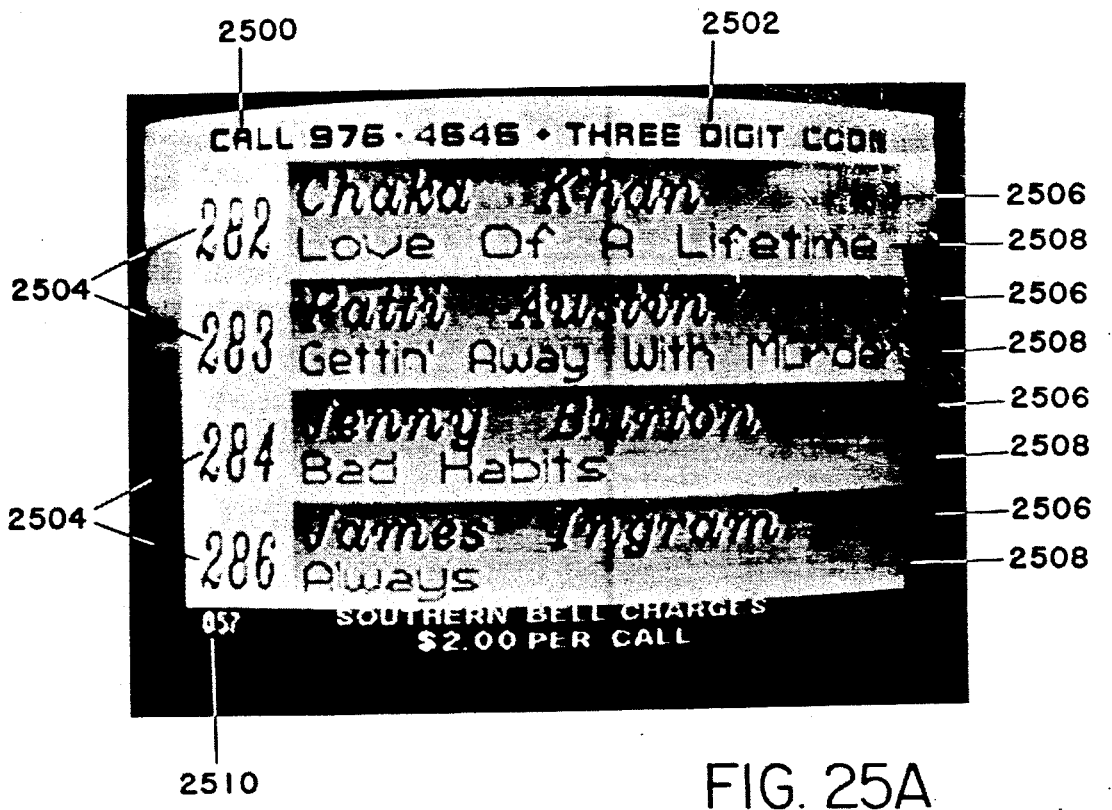
FIGS. 25A-D are pictorials of menu screens and other video and text information as displayed on a viewer's television receiver by the system of the present invention.

FIGS. 25A–D show examples of menu screens which are produced by the video selection system of the present invention. FIG. 25A displays the number a viewer is to call to select a video 2500 and the legend "three digit code" 2502 which informs the viewer to input a three digit code of the video program to be selected. FIG. 25A is typical of information shown as a menu between the display of selected video program material. Although the plurality of hundreds of different selections may be available, only four are shown on FIG. 25A.

The menu screen shown in FIG. 25A displays a plurality of three digit codes 2504 which correspond to a like plurality of video program selections. Each video program selection is indicated by the title of the artist 2506 as well as the title of the selection. The menu screen 25A also indicates that the particular telephone operating company charges a set fee per call as well as the current or last selection being displayed in 2510.

Figure 25B:
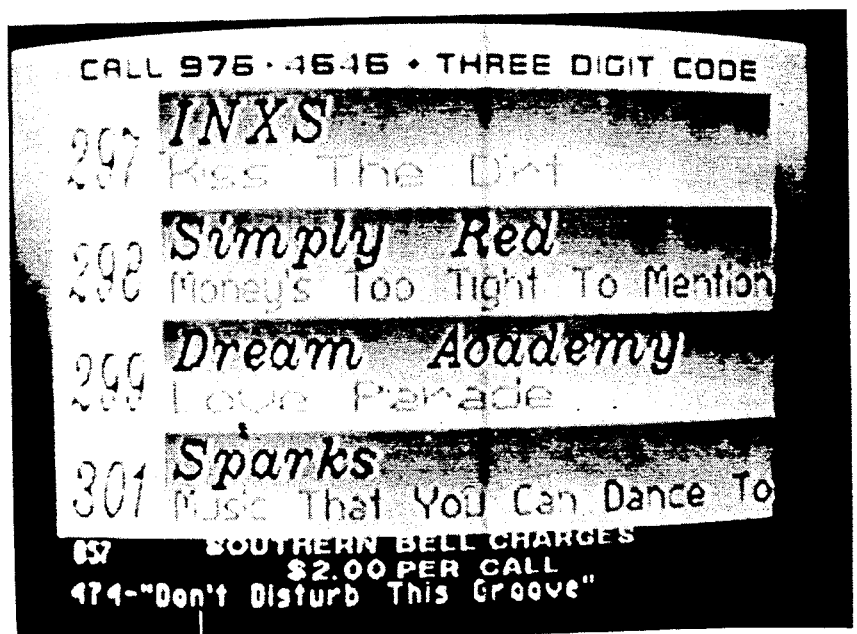

During the display of either the menu screen or a selected video, in addition to displaying the selection number of the currently playing, or in the case of the menu, the last played video selection, the video information selection system of the present invention also displays the artist and title information in a scrolling manner. For example, as shown in FIG. 25B, the title of selection number 474 is shown 2512. As shown in FIG. 25D the artist for a particular selection is also shown 2514. During broadcast by the video information selection system of the present invention, the entire menu is sequentially displayed in a scrolling manner such that each selection number together with the artist and then each selection together with the title of that particular video program is sequentially scrolled at the bottom of the screen of each of the viewer's television receivers.

Figure 25C:
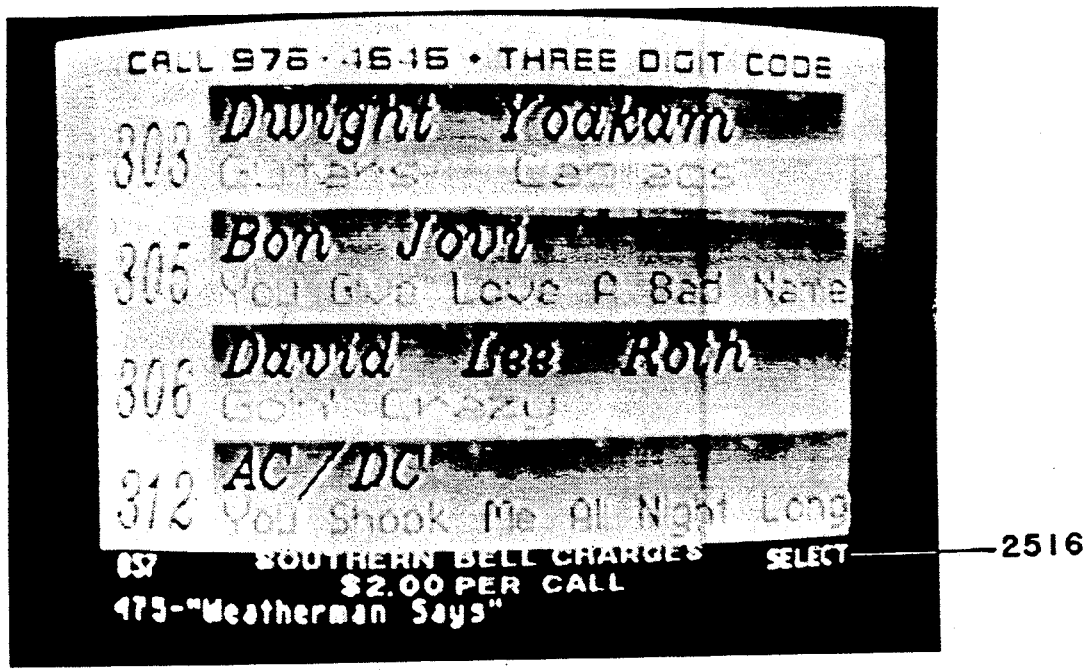
Figure 25D:

As shown in FIG. 25C and as described herein, whenever a viewer calls the information selection of the present invention to select a video program, the word select, in the event a single selection is to be made 2516 is displayed on the screen of all of the viewer's television monitors. As soon as the viewer makes the selection, the number selected is shown on the screen below the word "select". The system then replaces the word "select" with the phrase "Thank You" and adds the selected program to the queue as described hereinbefore. In the event that the viewer selects three videos for a different preset price, then the graphics on the screen of each of the viewer's television monitors sequentially display "Pick Number 1", "Pick Number 2" and "Pick Number 3", followed by the words "Thank You" after the viewer has entered the third selection number. It should be noted, however, that each of the succeeding "Pick Number" phrases are not displayed until after a selection has been made by the caller. In the event that the caller fails to enter a selection within a predetermined period of time, then, in the case of either a single selection or multiple selections, the video information selection system makes a jukebox pick for the viewer.

As previously described, the invention disclosed herein may be utilized to transmit dedication received at the host location by means of telephone company "800" numbers to the appropriate slave video information selection system. Such audio messages may be digitally recorded and then transmitted as a file to the slave system and cause to play at the appropriate time, by means of the programs disclosed herein for use with the host and slave systems. Such digital recording can be accomplished by means of the PC dialog device connected to the audio mixer. More particularly, the incoming telephone from a viewer wishing to place an audio message to be transmitted by the video information selection system will be answered by the PC dialog device whose digital device is sent to the host computer which then, using the appropriate program described herein, transmits that digitally recorded message to the appropriate slave video information selection system. The slave video information selection system, using the audio mixer 2418 mixes the audio message transmitted to it from the host system. The audio message is then transmitted by the slave video information selection system in the same manner as described above in connection with FIG. 24.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. An apparatus for the remote viewing of selected video program material at viewer remote receiving locations, comprising:
   a) a television broadcasting device for providing a television signal for transmission to said remote locations over a single common channel;
   b) a device for providing program signals to said television broadcasting means;
   c) a least one selectable source of video program materials;
   d) a selection device for generating a video program selection signal from a viewer remote receiving location with such selection being made through a telephone system keypad;
   e) a dedication device for generating a dedication message from a viewer corresponding to a video program selected by a viewer; and
   f) a programmed data processor, coupled to said at least one selectable source of video program materials, said dedication device and said device for providing program signals, for responding to telephonically transmitted selection and dedication signals from a remote location and for providing control signals to said at least one selectable source of video program materials in accordance with the desired video program selected by a viewer such that the selected video program and the corresponding dedication message generated from said dedication device are coupled by said device for providing program signals to said television broadcasting means for transmission over the single common channel to all of the viewer remote receiving locations viewing the single common channel irrespective of whether the viewers at such locations have selected any video program material so that a viewer at a remote receiving location may tune a television receiver at that location to the single common channel in order to sequentially view all of the selected video programs and corresponding dedications transmitted by said television broadcasting device over the single common channel.

2. The apparatus according to claim 1, wherein said dedication device includes a keyboard, connected to said programmed data processor, for inputting to said programmed data processor a dedication message received by a viewer.

3. The apparatus according to claim 1, wherein said dedication device includes a voice interface for receiving telephonic voice dedication messages from viewers and for converting the voice dedication messages from analog format into digital format for use by said programmed data processor.

4. The apparatus according to claim 3, further comprising an audio mixing device, connected to said voice interface, for converting the digitally formatted dedication message signals into audio dedication message signals and for mixing audio portions of a selected video program with the audio dedication message signals.

5. The apparatus according to claim 1, wherein a dedication message is broadcast by said broadcasting device at essentially the same time a corresponding selected video program is broadcast by said broadcasting device.

6. A remote viewing system, comprising:
   a television broadcasting device for providing a television signal for transmission to viewer remote receiving locations over a single common channel;
   a control station including:

a) a device for providing video program material signals to said television broadcasting means;

b) at least one selectable source of video program materials;

c) a selection device for generating a video program selection signal from a viewer remote receiving location with such selection being made through a telephone system keypad; and d) a first programmed data processor coupled to said at least one selectable source of video program materials and said device for providing video program signals to said television broadcasting device, said first programmed data processor being responsive to a video program selection signal transmitted from a remote location for providing control signals to said at least one selectable source of video program materials in accordance with the desired video program material selected by a viewer such that the selected video program material is coupled by said device for providing video program signals to said television broadcasting device for transmission over the single common channel to all of the viewer remote receiving locations viewing the single common channel irrespective of whether the viewers at such locations have selected any video program material so that a viewer at a remote receiving location may tune a television receiver at that location to the single common channel in order to sequentially view all of the selected video program materials transmitted by said television broadcasting device over the single common channel; and a remotely located monitoring and controlling device, including a second programmed data processor, for coupling to said first programmed data processor for two-way communication between said first and second programmed data processors for monitoring and controlling the operation of said control station by providing instructions for operating said control station directly to said first programmed data processor.

7. The system according too claim 6, wherein said second programmed data processor controls which video program material is provided by said control station to said broadcasting device.

8. The system according to claim 6, wherein said second programmed data processor is coupled to said first programmed data processor via a telephone link.

9. The system according to claim 6, wherein said second programmed data processor sends and receives data files to and from said first programmed data processor, respectively.

10. The system according to claim 6, wherein said selection device includes a low power radio-frequency transmitter and said control station includes a radio-frequency receiver for receiving radio-frequency selection signals transmitted by a viewer.

11. The system according to claim 6, wherein said selection and controlling device includes a two-way cable box for transmitting video selections to said control station and for receiving video material transmitted from said control station.

12. The system according to claim 6, wherein said monitoring selectively monitors the operation of a plurality of remote control stations.

13. The system according to claim 6, wherein said monitoring and controlling device selectively controls the operation of at least one remotely located control station.

14. The system according to claim 6, wherein said selectable source of video program materials includes magnetic tapes.

15. The system according to claim 6, wherein said selectable source of video program materials includes laser disks automatically retrieved and played by a robot.

16. The system according to claim 6, wherein said second programmed data processor monitors the number of times particular video materials have been selected over a predetermined time period.

17. The system according to claim 6, wherein said second programmed data processor monitors the revenues generated by said control station.

18. The system according to claim 6, wherein said second programmed data processor controls the selection of commercial advertising provided by said control station to said broadcasting device.

19. A system for the remote viewing of selected video program material at viewer remote receiving locations, comprising:

a) a television broadcasting device for providing a television signal for transmission to said remote locations over a single common channel;

b) a plurality of selectable sources of program material having video and audio portions;

c) a selection device for generating a video program selection signal from a viewer remote receiving location with such selection being made through a telephone system keypad;

d) a switching device connected to said plurality of selectable sources of program materials, for selectively switching video and audio portions of the program materials to said television broadcasting device;

e) a programmed data processor coupled to said plurality of selectable sources of program materials and said switching device, said programmed data processor being responsive to selection signals transmitted from a remote location for providing control signals to said at least one selectable source of program materials and to said switching device in accordance with the desired program material selected by a viewer such that selected video portions from one selectable source and selected audio portions from another source are transmitted to said television broadcasting device for broadcast over the single common channel to all of said viewer remote receiving locations viewing the single common channel irrespective of whether the viewers at such locations have selected any program material so that a viewer at a remote receiving location may tune a television receiver at that location to the single common channel in order to sequentially view all of the selected program materials broadcast by said television broadcasting means over the single common channel.

20. The system according to claim 19, further comprising a phone interface, connected to said programmed data processor, for receiving multiple telephonically transmitted program selection signals over a plurality of telephone request lines.

21. The system according to claim 20, wherein said phone interface polls each request line in sequence in order to determine if any of the lines is ringing.

22. The system according to claim 19, wherein said switching device further includes a generator device for generating selected program materials such that a video portion from a first source is mixed with an audio portion from a second source.

23. The system according to claim 19, wherein said switching device includes a graphic interface device, connected to said programmed data processor, for superimposing textual and graphic information on the video portion of the selected program material.

24. The system according to claim 19, wherein the video portion includes a menu listing several program selections with each selection assigned a corresponding numeric code.

25. The system according to claim 24, wherein a viewer selects a program by telephonically transmitting the corresponding numeric code.

26. A method for the remote viewing of selected video program material at viewer remote receiving locations comprising:
 a) providing at a control station at least one selectable source of video program materials;
 b) telephonically transmitting video program selection signals and corresponding dedication message signals from a remote location to the control station;
 c) receiving at the control station the transmitted selection signals and corresponding dedication message signals;
 d) retrieving from the at least one selectable source of video program materials the selected video program selected by a viewer.
 e) transmitting the selected video program and the corresponding dedication message by means of a television broadcasting device over a single common channel to all of the viewer remote receiving locations viewing the single common channel irrespective of whether the viewers at such locations have selected any video program material;
 f) tuning a television receiver at a remote viewing location to the single common channel; and
 g) sequentially viewing all of the selected video programs and the corresponding dedication messages transmitted by the television broadcasting device over the single common channel.

27. The method according to claim 26, wherein the receiving step (c) includes the step of inputting, via a keyboard located at the control station, a dedication message to be broadcast over the single common channel.

28. The method according to claim 26, wherein the receiving step (c) includes the steps of receiving telephonic voice dedication messages from viewers via a voice interface means and converting the voice messages from analog format into digital format for use by the control station.

29. The method according to claim 28, wherein the receiving step (c) further includes the steps of converting the digitally formatted dedication message signals into audio detection message signals and mixing audio portions of a selected video program with the audio dedication message signals.

30. The method according to claim 26, wherein the transmitting step (e) includes broadcasting the dedication message at essentially the same time the corresponding selected video program is broadcast.

31. A method for the remote viewing of selected program material at viewer remote receiving locations, comprising:
 a) providing at a control station at least one selectable source of video program materials;
 b) transmitting a video program selection signal from a viewer at a remote receiving location to the control station using a telephone keypad;
 c) receiving at the control station the transmitted selection signal;
 d) retrieving from the at least one selectable source of video program materials the selected video program;
 e) transmitting selected video program material to a television broadcasting device remotely located from the control station;
 f) transmitting the selected video program over a single common channel to all of the viewer remote receiving locations viewing the single common channel irrespective of whether the viewers at such locations have selected any video program material;
 g) tuning a television receiver at a remote receiving location to the single common channel;
 h) sequentially viewing all of the selected video program materials transmitted by said television broadcasting device over the single common channel; and
 i) remotely monitoring and controlling the operation of the control station during the steps a-e.

32. The method according to claim 31, further comprising the step of remotely controlling the video program material transmitted to the television broadcasting device.

33. The method according to claim 31, wherein the remotely monitoring and controlling step (i) is accomplished via a telephone link.

34. The method according to claim 31, wherein the remotely monitoring and controlling step (i) includes the steps of sending and receiving data files to and from the control station, respectively.

35. The method according to claim 31, wherein the transmitting step (b) includes the step of transmitting the video program selection signal using a low power radio-frequency transmitter and the receiving step (c) includes the step of receiving radio-frequency video program selection signals transmitted by a viewer.

36. The method according to claim 31, wherein the transmitting step (b) includes the step of transmitting video program selection signals over a two-way cable box and the receiving step (c) includes the step of receiving the transmitted video material over the two-way cable box.

37. The method according to claim 31, wherein the remotely monitoring and controlling step (i) further includes selectively monitoring the operation of a plurality of remote control stations.

38. The method according to claim 31, further comprising selectively controlling the operation of a plurality of remote control stations.

39. The method according to claim 31, wherein the at least one selectable source of video program materials includes magnetic tapes.

40. The method according to claim 31, wherein the at least one selectable source of video program materials includes laser disks automatically retrieved and played by a robot.

41. The method according to claim 31, wherein the remotely monitoring and controlling step (i) further includes a step of monitoring the number of times particular video materials have been selected over a predetermined time period.

42. The method according to claim 31, wherein the remotely monitoring and controlling step (i) further includes a step of monitoring revenues generated at the control station.

43. The method according to claim 31, further including the step of remotely controlling the selection of commercial advertising transmitted to the television broadcasting device.

44. A method for remote viewing of selected video program material at viewer remote receiving locations, comprising:
 a) providing at a control station a plurality of selectable sources of program material having video and audio portions;
 b) transmitting program material selection signals from a viewer at a remote receiving location to the control station;
 c) receiving at the control station the transmitted selection signals;
 d) retrieving from the at least one selectable source of program materials the program material selected by a viewer;
 e) transmitting selected video portions from one selectable source and selected audio portions from another selectable source to a television broadcasting means remotely located from the control station;
 f) transmitting the selected video and audio portions over a single common channel to all of the viewer remote receiving locations viewing the single common channel irrespective of whether the viewers at such locations have selected any program material;
 g) tuning a television receiver at a remote viewing location to the single common channel; and
 h) sequentially viewing all of the selected program materials transmitted by the television broadcasting means over the single common channel.

45. The method according to claim 44, wherein the receiving step (c) includes the step of receiving multiple, telephonically-transmitted, program selection signals over a plurality of telephone request lines.

46. The system according to claim 45, wherein the receiving step (c) further includes the step of polling each request line in sequence in order to determine if any of the lines is ringing.

47. The method of according to claim 44, wherein the transmitting step (e) further includes the step of generating selected program materials such that a video portion from a first source is mixed with an audio portion from a second source.

48. The method according to claim 44, wherein the transmitting step (e) includes the step of superimposing textual and graphic information on the video portion of the selected program material.

49. The method according to claim 44, wherein the transmitting step (b) includes the step of telephonically transmitting a numeric code corresponding to a program selection.

* * * * *